US009677469B2

United States Patent
Wittek

(10) Patent No.: US 9,677,469 B2
(45) Date of Patent: Jun. 13, 2017

(54) HYDRAULIC FREEWHEEL FOR AN INTERNAL COMBUSTION ENGINE WITH VARIABLE COMPRESSION RATIO

(71) Applicant: FEV GmbH, Aachen (DE)

(72) Inventor: Karsten Wittek, Aachen (DE)

(73) Assignee: FEV Europe GmbH, Aachen (DE)

(*) Notice: Subject to any disclaimer, the term of this patent is extended or adjusted under 35 U.S.C. 154(b) by 316 days.

(21) Appl. No.: 14/418,158

(22) PCT Filed: Jul. 30, 2013

(86) PCT No.: PCT/EP2013/002255
§ 371 (c)(1),
(2) Date: May 15, 2015

(87) PCT Pub. No.: WO2014/019683
PCT Pub. Date: Feb. 6, 2014

(65) Prior Publication Data
US 2015/0260094 A1 Sep. 17, 2015

(30) Foreign Application Priority Data

Jul. 30, 2012 (DE) .................. 10 2012 014 916
Oct. 26, 2012 (DE) .................. 10 2012 020 999

(51) Int. Cl.
| F02B 75/04 | (2006.01) |
| F02B 75/26 | (2006.01) |
| F16C 7/06 | (2006.01) |
| F16C 23/10 | (2006.01) |

(52) U.S. Cl.
CPC .............. *F02B 75/045* (2013.01); *F16C 7/06* (2013.01); *F16C 23/10* (2013.01)

(58) Field of Classification Search
CPC .......... F02B 75/045; F02B 75/32; F16C 7/06; F16C 23/10; F02F 7/0053; F02F 3/00; F16H 19/04; F15B 15/14; F15B 15/1457; F16K 31/122; F16K 11/07
USPC ........................ 123/48 B, 78 BA, 48 R, 78 E
See application file for complete search history.

(56) References Cited

U.S. PATENT DOCUMENTS 2,989,954 A 6/1961 Hulbert

FOREIGN PATENT DOCUMENTS

| DE | 102005055199 A1 | 5/2007 |
| DE | 102010061363 A1 | 6/2012 |
| EP | 0297904 A2 | 1/1989 |
| EP | 0438121 A1 | 7/1991 |

*Primary Examiner* — Carlos A Rivera
*Assistant Examiner* — Syed O Hasan
(74) *Attorney, Agent, or Firm* — Dinsmore & Shohl LLP

(57) ABSTRACT

A reciprocating-piston internal combustion engine having a hydraulic adjustment mechanism which is assigned to a connecting rod and which comprises at least one eccentric, for adjusting at least one variable compression ratio in at least one cylinder of the reciprocating-piston internal combustion engine by means of a change in an effective length of a connecting rod. Also proposed is a method for changing the effective length of a connecting rod.

13 Claims, 30 Drawing Sheets

D-D 42 43

45

E-E

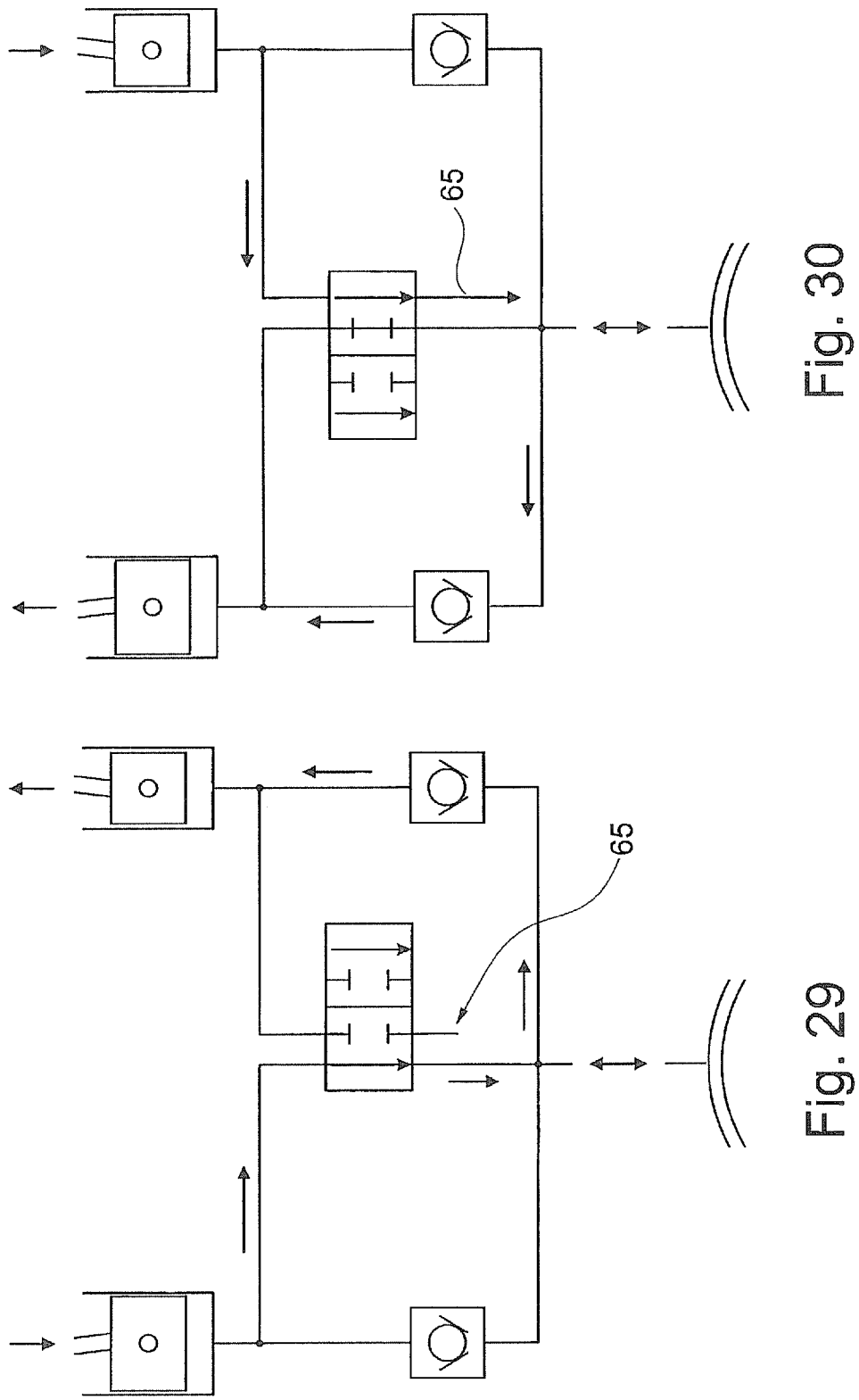

HYDRAULIC FREEWHEEL FOR AN INTERNAL COMBUSTION ENGINE WITH VARIABLE COMPRESSION RATIO

CROSS-REFERENCE TO RELATED APPLICATIONS

This application is the U.S. national phase of PCT/EP2013/002255 filed Jul. 30, 2013, which claims priority of German Patent Application 10 2012 014 916.6 filed Jul. 30, 2012, and German Patent Application 10 2012 020 999.1 filed Oct. 26, 2012, the entire contents of which are incorporated herein by reference.

FIELD OF THE INVENTION

The present invention relates to a reciprocating-piston internal combustion engine with a hydraulic adjusting mechanism assigned to a connecting rod and comprising at least one eccentric arranged in a connecting rod bearing eyelet or a piston pin bearing eyelet of a connecting rod for adjusting at least one variable compression ratio of the combustion in at least one cylinder of the reciprocating-piston internal combustion engine by changing the effective length of the connecting rod by means of the adjusting mechanism.

BACKGROUND OF THE INVENTION

Various technical approaches for a variable compression ratio are known from the prior art. Using variable adjustable engine components, the following specific possibilities are described below:
  connecting rod with variable length
  piston with variable compression height, and
  crankshaft with variable crank radius.
All these technical measures are directed, among others, to realize a variable compression.

For a variation of the cinematically effective lengths of the engine, i.e. the connecting rod length, the compression height or the crank radius, both telescopic elements and eccentric bearings are known. In some approaches, the active principle, "use of engine power for adjustment" is applied. Here, the forces acting at the eccentric bearing or at a telescopic element are used for adjustment. On the one hand, adjustment to a desired position should be as fast as possible, but, on the other hand, without damage and significant generation of noise. Experimental studies have shown that an adjustment from one end position to the other, for example, of an eccentric in the small connecting rod eyelet, can be realized within one working cycle, however, the components are damaged when a mechanical end stop is reached. As a consequence, the adjustment process must be decelerated and thus extends over several working cycles, which may be referred to as a multi-cycle principle. This, in turn, requires a device that prevents an unintentional reverse adjustment, i.e. a freewheel, for which the freewheeling direction must be reversible. This switchable freewheel can be realized by a hydraulic system. The known systems for realizing such a switchable hydraulic freewheel have in common that two support chambers are provided, which can support the forces and moments and prevent undesired reverse adjustment. These support chambers can be designed as reciprocating pistons or rotary pistons. DE 10 2005 055 199 describes a length-variable connecting rod for realizing a variable compression, abbreviated as VCR. Switching the freewheeling direction is effected by alternately opening and closing two supporting cylinders, wherein a 3/2-way valve is used to control the outflowing oil flow. This will be explained in detail in the following Figures with reference to FIG. 1 which shows the hydraulic circuit diagram used in DE 10 2005 055 199. Further, reference is made to the content of this publication to illustrate the basic structure of a VCR mechanism.

A VCR system of such design has the following disadvantages:

a. during the adjustment, a large oil volume flow is required to fill the momentarily expanding support cylinder. In order to supply the comparatively large momentary volume flow, sufficiently large-sized supply bores are required in the crankpin of the crankshaft, as well as supply grooves in the connecting rod bearing. Specifically the grooves in the connecting rod bearing weaken the bearing load capacity. Conversely, this means that the adjustment rate must be strongly limited in order to still be able to reliably supply the expanding support cylinder even with a small supply line system.

b. Upstream of the non-return valve, the supply pressure of the connecting rod bearing prevails. During the filling of the expanding support cylinder, the oil volume flow flowing through the non-return valve causes a pressure drop across the non-return valve. The maximum value of the adjustment rate has to be limited such that the oil pressure downstream of the non-return valve in the support cylinder still remains above the vapor pressure of the oil in order to avoid cavitation. In structures realized, it has been found that this cavitation criterion is already effective at an earlier time than the pulse criterion, i.e. the mechanical destruction due to an excessive impact speed of the support cylinder at the mechanical end stop.

c. When the system is in its final position, an oil volume flow is still drawn from the supply system. This is the case, for instance, if the left support piston shown in FIG. 1 has reached its lower end position. Then oil continues to flow from the supply system through the non-return valve into the left support cylinder and from there into the crankcase via the 3/2-way valve.

It is an object of the present invention to enable a faster switching and to thereby reduce an influence on the oil management of the engine.

SUMMARY OF THE INVENTION

This object is achieved with a reciprocating-piston engine having the features of the claims. However, the features resulting from the individual dependent claims are not limited to the individual embodiments. Rather, one or a plurality of features from the main claim, as well as from the dependent claims can be specified by or also be replaced with one or a plurality of the features mentioned in the following description. In particular, the present claims are to be understood only as a first attempt at putting the invention into words, but without intending to restrict the invention. Further, one or a plurality of features from different embodiments may be combined into further developments.

It is proposed to provide an internal oil recirculation in the connecting rod between the hydraulic cylinder of the adjustment mechanism. Preferably, an overflow from one hydraulic cylinder to the other is enabled via a controllable valve or a valve circuit in the internal oil recirculation.

The above mentioned disadvantages can be avoided or reduced, if the oil escaping from the valve or the valve circuit, for example a 3/2-way valve, is not released into the crankcase, but is returned to the supply system. In this context, "internal oil transfer" is introduced as a term for this purpose.

A reciprocating-piston internal combustion engine with a hydraulic adjustment mechanism is proposed, wherein the hydraulic adjustment mechanism has assigned thereto a connecting rod, and the hydraulic adjustment mechanism comprises at least one eccentric arranged in a connecting rod bearing eyelet or a piston pin bearing eyelet of a connecting rod, for adjusting at least a variable compression ratio in at least one cylinder of the reciprocating-piston internal combustion engine by changing an effective length of the connecting rod by means of the adjustment mechanism, wherein the adjustment mechanism comprises a first hydraulic cylinder with a first piston in a first fluid chamber and a second hydraulic cylinder with a second piston in a second fluid chamber, and the hydraulic cylinders are operated with a fluid, and an adjustment of at least one variable compression ratio is effected by means of a movement of at least the first piston in the first hydraulic cylinder, wherein the first and second fluid chambers are connected via a first fluid line for a direct flow of the fluid back and forth between the first and the second fluid chamber during the movement of the first piston in the first hydraulic cylinder, wherein the first fluid line is arranged in the connecting rod. According to an embodiment, the first fluid line is connected at one end to the first fluid chamber and at another end to the second fluid chamber.

The first fluid line is preferably formed by one or a plurality of bores that allow a passage of the fluid. Here, at least a section of the first fluid line can be designed as a channel, wherein the channel extends along a plane of separation of a component of the connecting rod. Thus, a first half of the channel may be arranged in a first half part of the component and a second half of the channel may be arranged in a second half part, which, when lying one upon the other, can together form a bore. For example, this may be provided in an area adjacent the piston pin bearing eyelet.

Preferably, a valve system is arranged in the first fluid line, whereby a fluid flow can be interrupted in the first fluid line. The valve system may include, for example, a 3/2-, a 3/3-, a 4/2 or also a 4/3-way valve.

Another embodiment provides, for instance, that a fluid supply system is connected to the first fluid line, whereby, upon movement of the first piston in the first hydraulic cylinder, an additionally required quantity of fluid flows into the first fluid chamber and an excess quantity of the fluid in the first fluid chamber in the first hydraulic cylinder flows into the fluid supply system, and the fluid supply system comprises a fluid reservoir in which the excess quantity of fluid is collected and from which the additionally required quantity of fluid is supplied, wherein the fluid supply system is connected directly to the first fluid line or is connected to the first fluid line via a second fluid line which is a connection between the first fluid line and the fluid supply system.

The fluid reservoir and, specifically, the fluid supply system are arranged in the connecting rod.

The first fluid line is intended for the flow of fluid back and forth between the hydraulic cylinders and, possibly, also for fluid from the fluid supply system. The second fluid line, however, is only provided for fluid from the fluid supply system.

Further, a reciprocating-piston internal combustion engine is proposed, wherein the first piston and the second piston have differently sized piston surfaces and the first and second hydraulic cylinders have corresponding differently sized sections.

In another embodiment it is provided that the first fluid line in the connecting rod comprises a first hydraulic resistance by which the back-and-forth flow of the fluid is throttled. For example, it is thereby possible to limit a rate when adjusting at least one variable compression ratio. In this regard, it is preferred to use a diaphragm. Thereby, an adjustment rate can be influenced.

For example, a non-return valve is mounted in the first fluid line in order to restrict the back-and-forth flow of the fluid at a location in the first fluid line, at which the non-return valve is arranged, to one direction. Thus, the first fluid line may have several subsections, which each extend from the valve to either the one or the other hydraulic cylinder.

A characteristic of the hydraulic resistance can be, for example, described as follows: compared to a friction brake, for instance, a limitation of the pivoting speed of the eccentric by means of a hydraulic resistance already has the advantage of a rate-proportional braking effect. As a resistance, both a throttle and an orifice, as well as a combination of both can be used. The use of an orifice has the advantage that the relationship between the flow rate and the pressure difference has only a very small temperature dependence. Thus, the influence of the oil temperature on the adjustment time is also little. In a system realized, the flow behavior of the path from the pressure-loaded support cylinder to the crankcase or the expanding support cylinder will be situated between the behavior of a pure throttle flow and a pure orifice flow. A temperature dependence that is as low as possible can be achieved by reducing the throttling effect in all lines to and from the resistance, as far as possible, i.e. by providing correspondingly large line cross-sections. Thereby, resistance realized as a pure orifice is by far the dominant resistance.

The hydraulic resistance is preferably realized as follows:
a stepped bore,
a separate insert fitted, pressed or screwed into place, and/or integrated in other parts, for example, in portions of the way valve.

Preferably, the adjustment mechanism includes a system for a defined position detection of the hydraulic adjustment mechanism. Thereby, it can be determined whether, for example, a piston is in a certain position. It is possible, for example, to monitor an adjustment rate, e.g. by monitoring the path or velocity of one of the pistons of the adjustment mechanism in the connecting rod. It is further possible to pick up a rotation of the eccentric and to conclude therefrom on a position of a piston or of another component of the adjustment mechanism. Further, a detection of a stop can be provided, wherein a position is defined by the stop. For this purpose, it is preferred to use an end position of a component of the adjustment mechanism.

A development provides, for example, that the hydraulic adjustment mechanism has a defined operating position. This means that it can be verified that the adjustment mechanism is in a defined position. In this manner, an incorrect position can be determined, for example. It is further possible, for example, to detect other deviations, e.g. caused by a switching malfunction such as no switching, by wear or by other influences. Thereby, a re-setting or a readjustment is made possible, if, for example, a deviation should be detected. The deviation may be detected relative to an adjustment mechanism of a connecting rod. However, it is also possible to compare the positions, the conditions and, in particular, the deviation of hydraulic adjustment mechanisms of different connecting rods. Thereby, it is possible, for example, to monitor that all adjustment mechanisms are in the same position. A wrong positioning of one or a plurality of adjustment mechanisms can then be corrected. One embodiment provides, for example, that all adjustment mechanisms of all connecting rods are actuated the same. This means that, for example, all connecting rods are adjusted the same in their effective length. Another embodiment provides, for example, that different connecting rods have different effective lengths. Thus, for example, in case of cylinder deactivation, only the active cylinders are operated, while the non-active, deactivated cylinders continue to operate without a change in the effective length of their associated connecting rods. Further, a reset position may be provided for securing the same position and thus the same effective length for all connecting rods. If a deviation of the positions is determined, a reset positioning can be triggered, in which at least one or a plurality of adjustment mechanisms move to a defined position and, from there, an adjustment can again be made in a defined, predictable manner.

Preferably, the reciprocating-piston internal combustion engine has a switching system provided on each connecting rod for the adjustment mechanism, preferably in the form of a valve system, which is located in the region of the piston pin bearing eyelet on an outer side of the connecting rod, so that the switching system can be actuated, for example in the form of the valve system, from the outside of the connecting rod.

Thus, depending on the type of engine structure and the associated arrangement of cylinders, the switching system can be arranged at a different position. A position for in-line engines, boxer engines, V-type engines and, consequently, the position of the connecting rod relative to the oil sump, lead to different arrangements of the adjustment mechanism, in particular under the aspect of space saving.

According to another idea of the invention, which can be realized independently, as well as in combination with the above reciprocating-piston engine, a method is proposed for changing a variable compression ratio in a cylinder of a reciprocating-piston internal combustion engine by actuating a hydraulic adjustment mechanism, wherein the adjustment mechanism is assigned to a connecting rod of a reciprocating-piston internal combustion engine, and wherein the connecting rod includes a piston pin bearing eyelet at one end and a connecting rod bearing eyelet at the other end, wherein, in the piston pin bearing eyelet or the connecting rod bearing eyelet, an eccentric supported therein rotates, provided that a first piston moves in a first hydraulic cylinder and a second piston moves in an opposite direction in a second hydraulic cylinder, wherein an effective length of the connecting rod is changed, and wherein, in the connecting rod, the movement of the piston that causes the adjustment of the eccentric is effected through a fluid overflow through a first fluid line from the first hydraulic cylinder directly into the second hydraulic cylinder.

In a further development, it is provided that an overflow of fluid occurs from the first hydraulic cylinder into the second hydraulic cylinder via the first fluid line, this overflow being interrupted by means of a valve system.

It may further be provided that excess fluid in the first fluid line flows into a fluid supply system, and an additional need for fluid in the first fluid line is fed from the fluid supply system.

Preferably, the adjustment mechanism is moved into a defined position, for example, to be used in a motor control as a starting point for an adjustment of the VCR mechanism.

Further advantageous embodiments and further developments are obvious from the following Figures. However, the features obvious from the drawings shall not be limited to the individual embodiment. Rather, one or a plurality of features of one or a plurality of embodiments may be combined with each other but also with features from the above general description of the invention to form further embodiments. Therefore, the following embodiments serve to illustrate different possibilities and aspects of the invention, without intending to limit the same to these embodiments.

BRIEF DESCRIPTION OF THE FIGURES

In the drawings:

FIG. 29 shows a hydraulic freewheel with a 4/2-way valve with a partial internal oil transfer for an adjustment towards a low compression, FIG. 30 shows a hydraulic freewheel with a 4/2 way valve with a partial internal oil transfer for an adjustment towards a high compression.

DETAILED DESCRIPTION OF THE INVENTION

Figure 1:
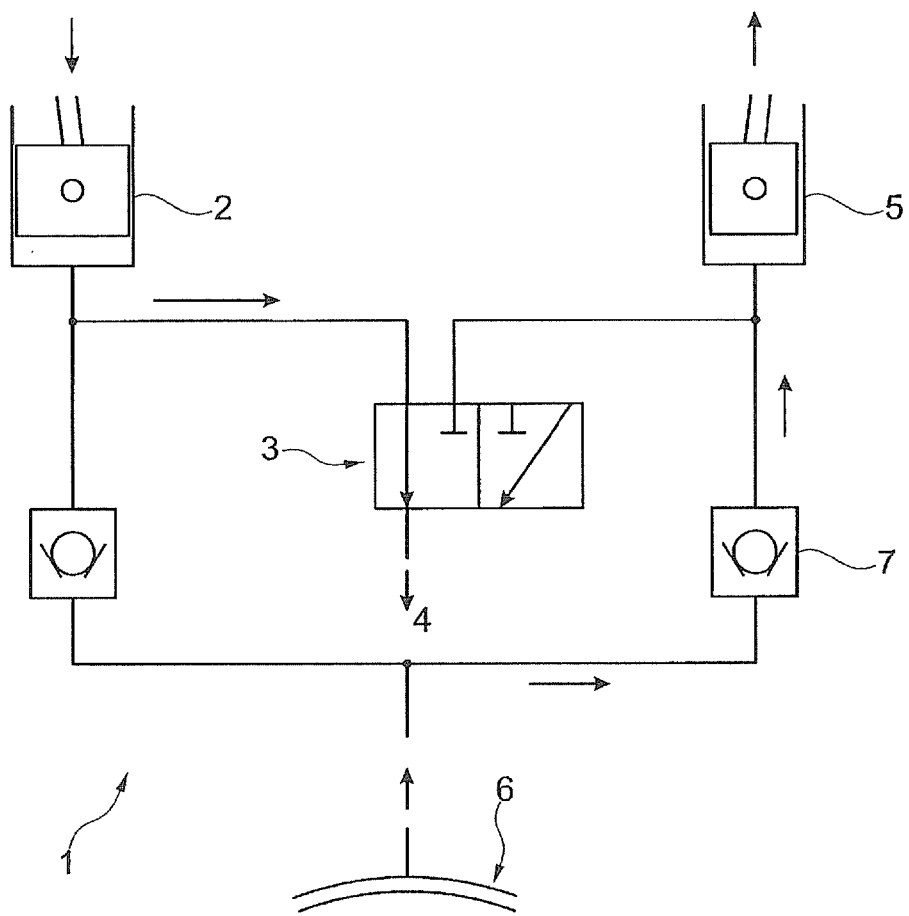
FIG. 1 is a schematic illustration of a hydraulic freewheel, as it is known from DE 10 2005 055 199.

FIG. 1 shows a hydraulic freewheel with a 3/2-way valve, as known from DE 10 2005 055 199. In the switching position 1 illustrated, the left support piston 2 may plunge. The oil displaced from this cylinder flows via the valve 3 into the crankcase 4. The expanding support cylinder 5 draws fresh oil from the supply groove 6 via the non-return valve 7. In this arrangement, the following states exist:

a) the eccentric can rotate clockwise b) the eccentric can rotate in a counterclockwise direction Thus, two stable compression stages exist, so that the system may be referred to as a 2-stage VCR system. However, in operation, the VCR system may show problems as described in more detail above.

Figure 2:
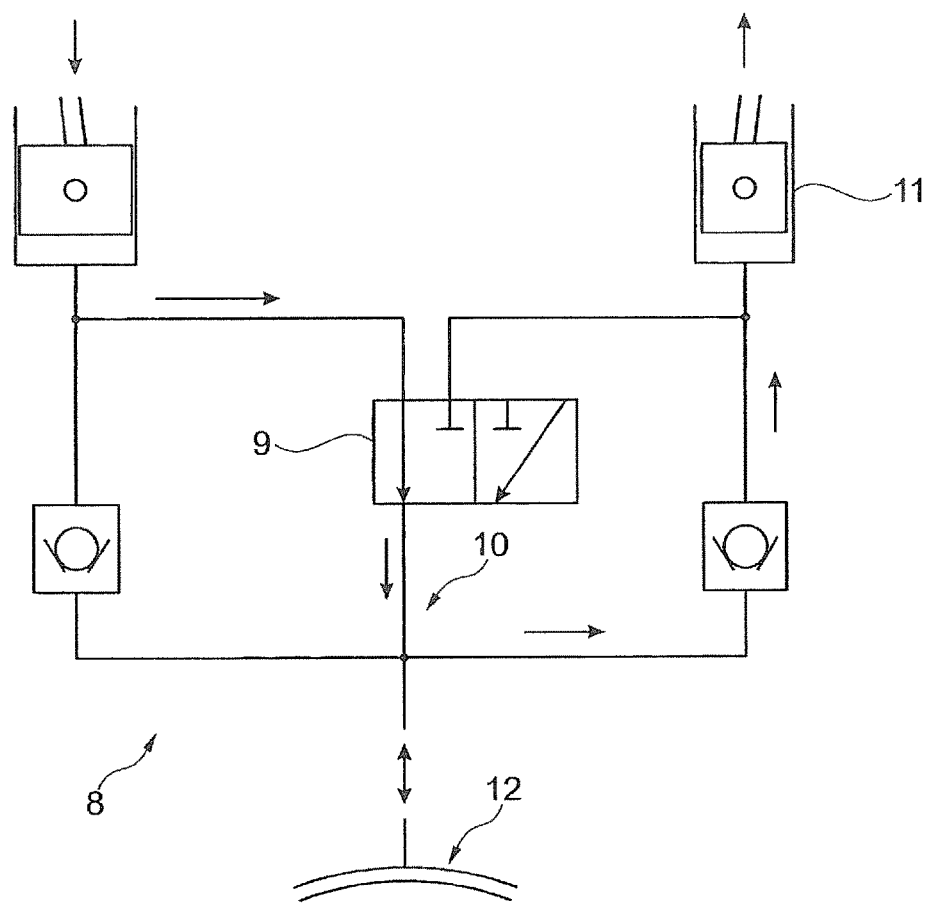
FIG. 2 is a hydraulic circuit diagram with a 3/2-way valve and internal oil transfer, which are provided in a connecting rod according to the invention.

FIG. 2 shows a hydraulic diagram 8 with a 3/2-way valve 9 and an internal oil transfer 10. The quantity of oil displaced is used to fill the expanding support cylinder 11. Depending on the diameter ratio of the support cylinder and the lever ratios, either more oil is displaced than is required for filling the expanding cylinder, or vice versa. Excess oil flows through the lubricating gap of the connecting rod into the crankcase. Additionally required oil is conveyed via the supply groove 12. It is an advantage of this internal oil transfer 10 that the oil management of the engine is loaded less. In this case, the supply groove 12 can be made smaller. This internal oil transfer is disadvantageous in that air possibly drawn in once remains in the VCR connecting rod for a longer time and, upon switching, is displaced from one support cylinder to the other, instead of being replaced with fresh oil. However, this can be counteracted by suitable ventilation. In this arrangement, too, two stable compression stages exist.

Figure 3:
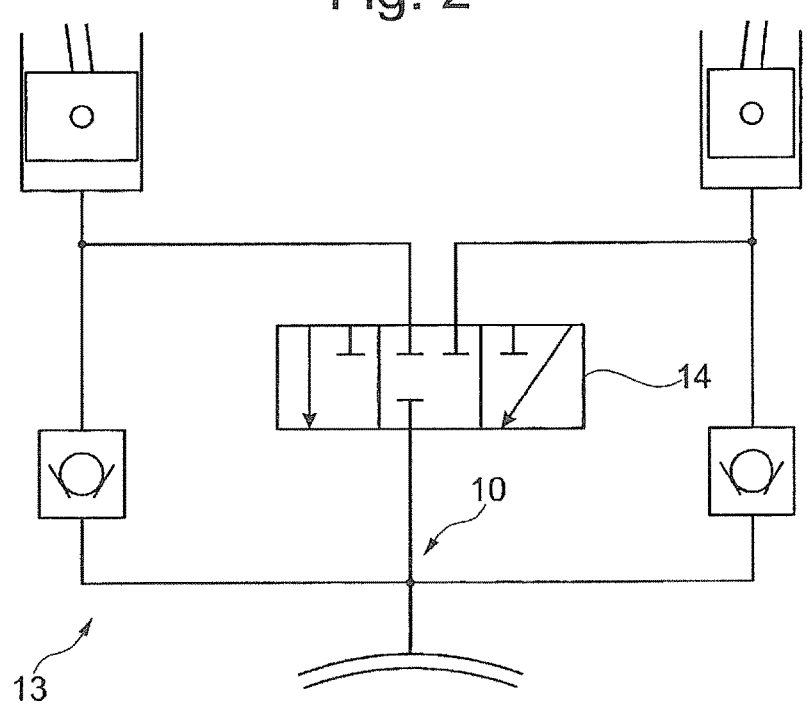
FIG. 3 illustrates a hydraulic freewheel with a 3/3-way valve with internal oil transfer.

FIG. 3 shows a hydraulic freewheel 13 with a 3/3-way valve with internal oil transfer 10. By replacing the 3/2-way valve with a 3/3-way valve 14, a further state can be realized, namely, the state of "eccentric blocked." In this manner, intermediate positions can also be maintained. FIG. 3 shows such an arrangement with an internal oil transfer.

The internal oil transfer proposed can significantly reduce the limitation of the adjustment rate for a given conveying capacity of the supply system, i.e. allow a significantly higher adjustment rate. In this regard, it may be useful to limit the adjustment rates to different degrees in the respective directions, for example, by means of a hydraulic resistance, e.g. an orifice. With gasoline engines, it is desirable to achieve the shortest possible changeover time from high to low compression so as to avoid a knocking combustion during a load change towards high load. In the other direction, the adjustment may occur much more slowly. This fact can be utilized by designing the support cylinders and their cinematic coupling such that excess oil is produced during an adjustment from high to low compression. In this case, oil is drawn from the supply system only during the transition to a high compression, which may take a relatively long time. The conveying capacity of the supply system can thus have small dimensions, with the consequence that only little supporting bearing surface must be sacrificed. A further positive effect to be mentioned is that the oil volume flow recirculated into the supply system also causes a short pressure increase upstream of the non-return valve, which counteracts the cavitation in the expanding support cylinder.

Figure 4:
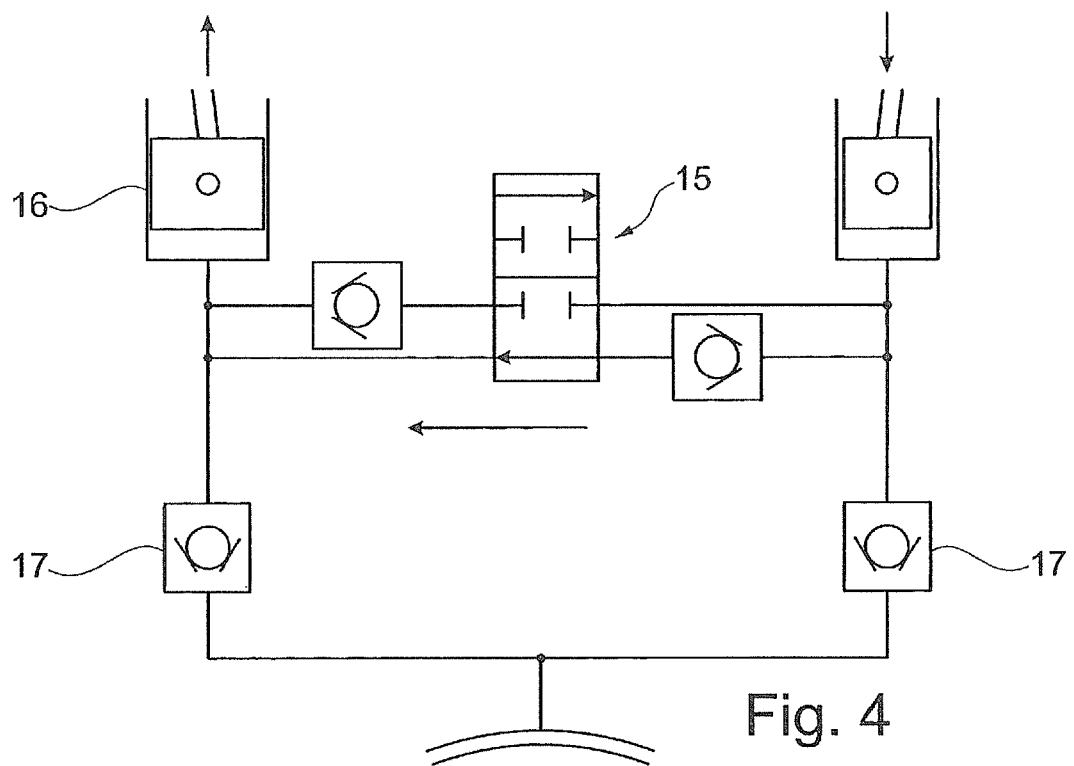
FIG. 4 illustrates a hydraulic freewheel with a 4/2-way valve with internal oil transfer.

FIG. 4 shows an arrangement with a 4/2-way valve 15. Here, cavitation no longer needs to be considered. Basically, even higher adjustment rates can thereby be achieved. The oil displaced is pushed directly into the respective expanding cylinder 16. It is a prerequisite for such a circuitry that, at any time, the displaced volume flow must correspond to the volume flow drawn. This is not readily possible with the present VCR connecting rod. However, in systems with a rotary piston, this requirement may very well be met. For a compensation of leakage, both support cylinders are additionally connected with the supply system via a respective non-return valve 17. Therefore, the supply system only as to compensate for leakage and can be dimensioned correspondingly small.

Figure 5:
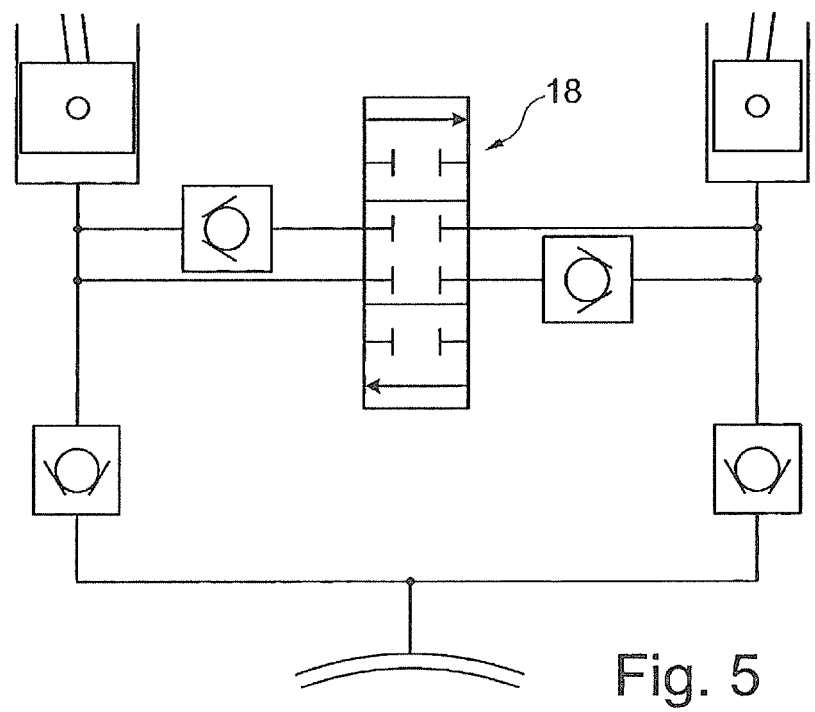
FIG. 5 shows a hydraulic freewheel with a 4/3-way valve with internal oil transfer.

FIG. 5 shows a hydraulic freewheel with a 4/3-way valve 18. By use of a 4/3-way valve, instead of a 4/2-way valve, it is also possible to realize a blocking of the eccentric, as shown in FIG. 5.

Hereunder, reference is made in particular to various geometries that can be described as arrangements of a hydraulic resistance. This is explained in a general manner below with reference to FIGS. 6 and 7, before special advantageous further embodiments are described with reference to FIGS. 8 and 9.

Figure 6:
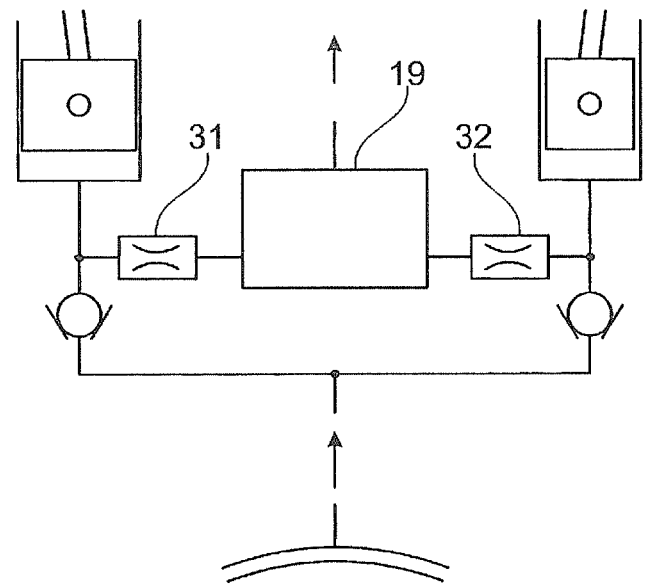
FIG. 6 illustrates different systems with a 3/3 or 3/2-way valve without internal oil transfer.
Figure 7:
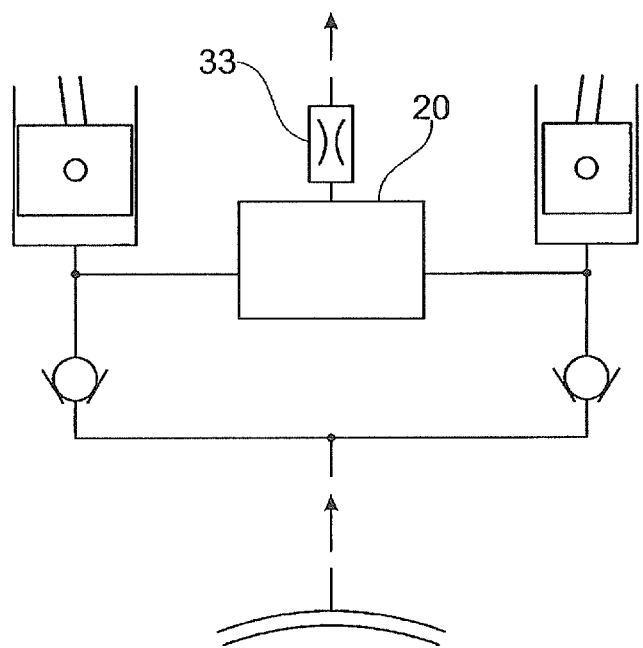
FIG. 7 illustrates different systems with a 3/3 or 3/2-way valve without internal oil transfer.

A limitation of the eccentric turning rate can be achieved by providing a resistance to the displaced oil. In FIG. 6 and FIG. 7, two possible arrangements of such resistances 31, 32, 33 are shown without internal oil transfer and using a 3/2 or a 3/3-way valve 19, 20. In one arrangement, a resistance is provided in each outflow line, while in the other arrangement a common resistance is used. When two resistances are used, the adjustment directions can be limited separately with respect to their rate.

Figure 8:
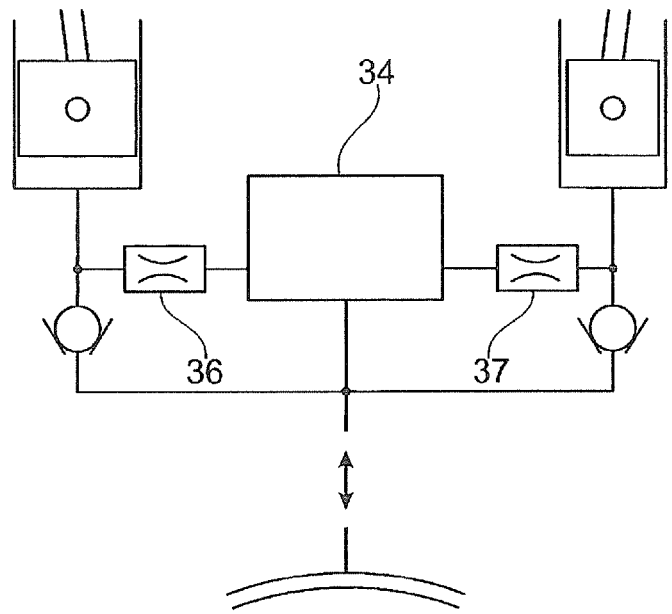
FIG. 8 illustrates different systems with a 3/3 or 3/2-way valve with internal oil transfer.
Figure 9:
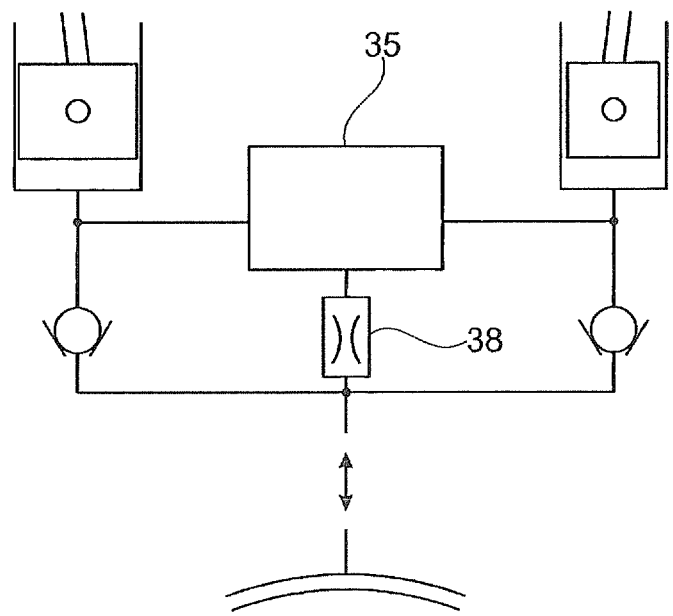
FIG. 9 illustrates different systems with a 3/3 or 3/2-way valve with internal oil transfer.

In arrangements of systems using a 3/3 or a 3/2-way valve 34, 35 with internal oil transfer, it is also possible to use two resistances 36, 37 or only one resistance 38, as shown in FIG. 8 and FIG. 9.

Figure 10:
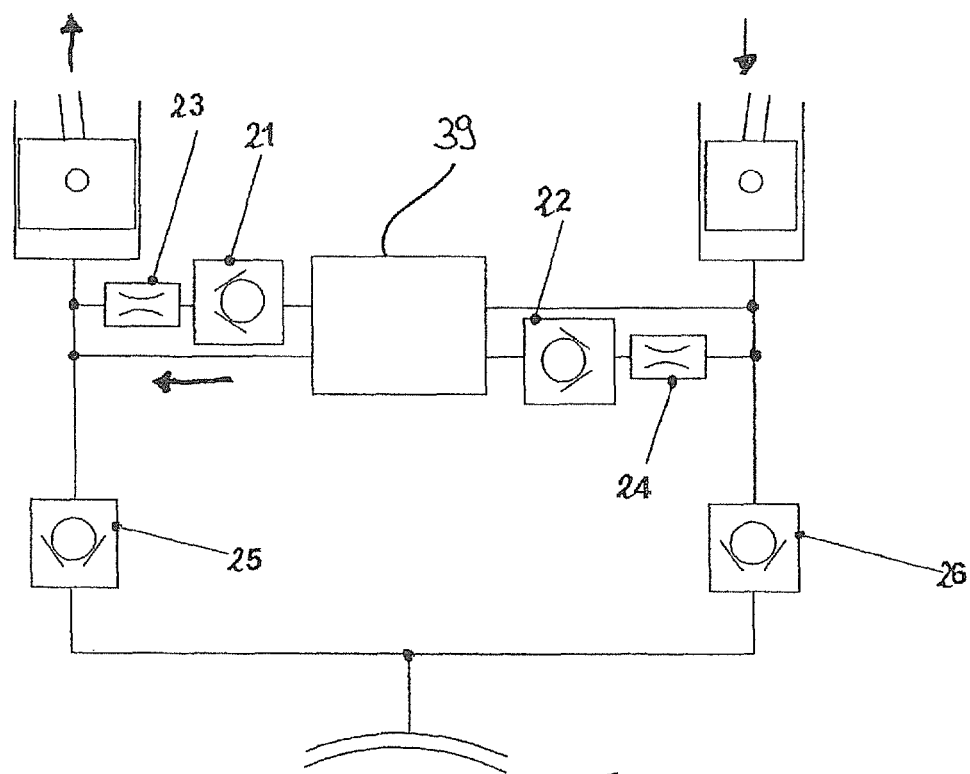
FIG. 10 shows different systems with a 4/3 or 4/2-way valve.
Figure 11:
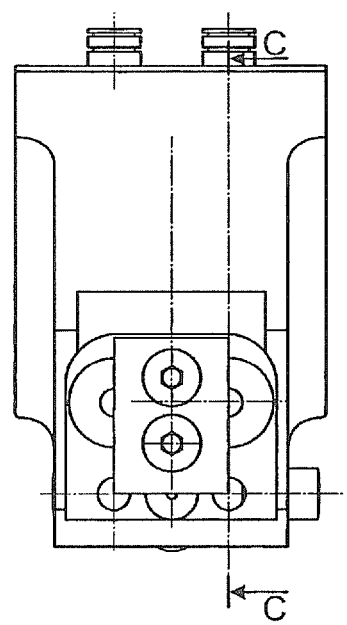
FIG. 11 shows an exemplary embodiment of a system with 3/2-way valve function and internal oil transfer.
Figure 12:
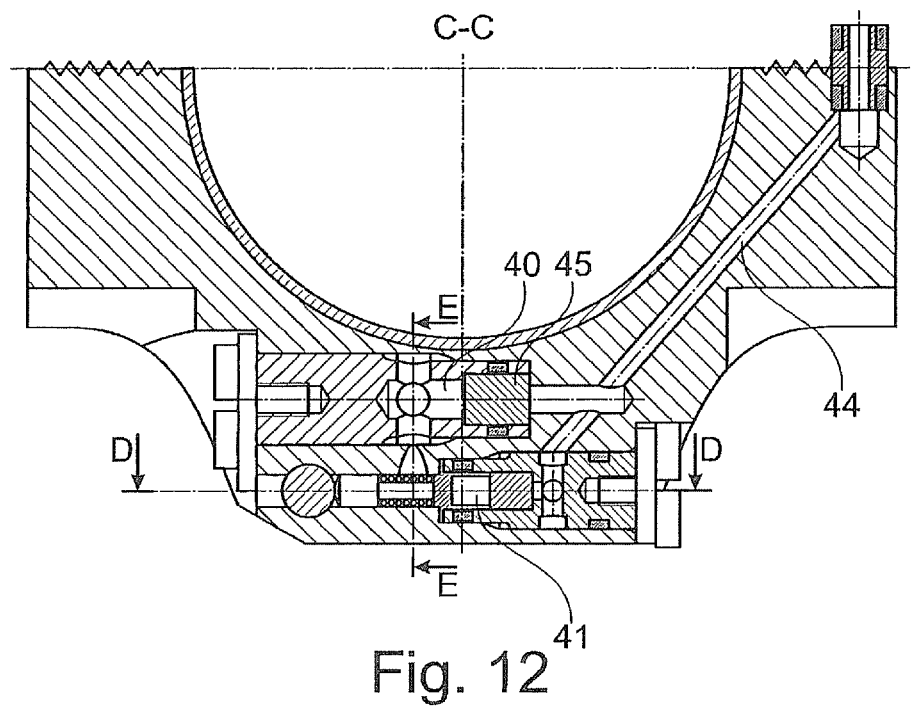
FIG. 12 shows an exemplary embodiment of a system with 3/2-way valve function and internal oil transfer.
Figure 13:
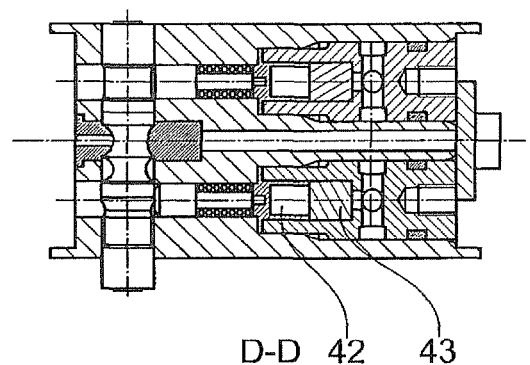
FIG. 13 shows an exemplary embodiment of a system with 3/2-way valve function and internal oil transfer.

FIG. 10 shows systems with a 4/3- or a 4/2-way valve 39. When a 4/3- or a 4/2-way valve 39 is used, two resistances 23, 24 are necessary, which can be positioned as shown in FIG. 10. The non-return valves 21, 22 allow a direct, internal oil supply from one cylinder to the other. As illustrated, the cylinders may have different diameters.

The non-return valve 21 and/or the resistance 23 may also be arranged to the right of the way valve. Analogously, the non-return valve 22 and/or the resistance 24 may be arranged to the left of the way valve. Further, the non-return valves 25, 26 serve to direct oil flowing in.

Figure 14:
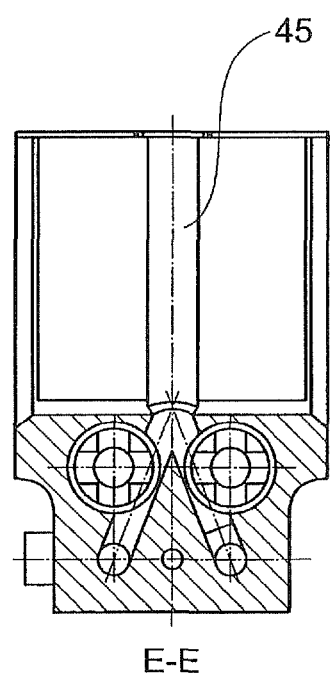
FIG. 14 shows an exemplary embodiment of a system with 3/2-way valve function and internal oil transfer.

FIG. 11 to FIG. 14 show an embodiment of a system with a 3/2-way valve and an internal oil transfer. The 3/2-way valve function is realized by two 2/2-way valves 40, 41, 42 which are alternately opened and closed. In each outflow line, the outflow line 44 from the support cylinder is illustrated in the present instance, a resistance provided. The seat valves are opened or closed by means of a follower element, wherein the non-return valves 43, 45 are arranged at the seat valves. FIG. 14 illustrates the position of the supply groove 45.

Figure 15:
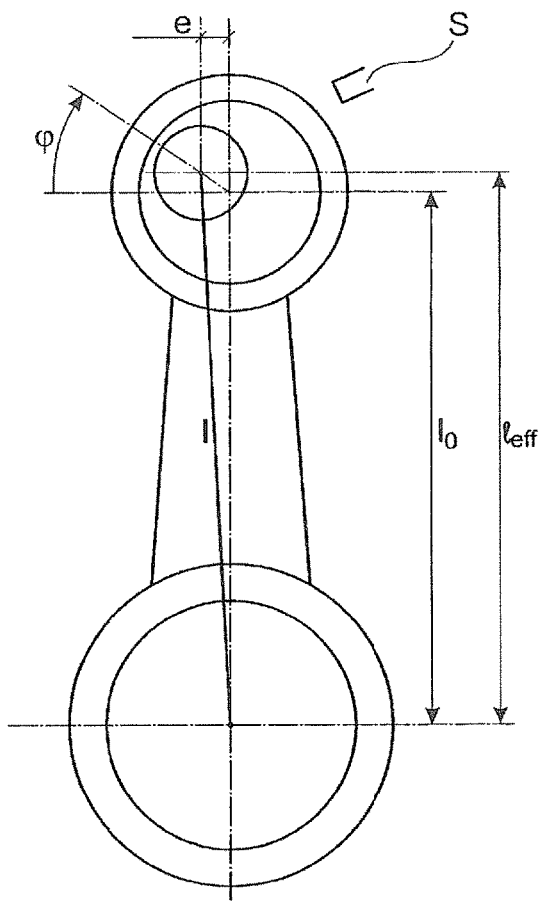
FIG. 15 illustrates an adjustment of a connecting rod.
Figure 16:
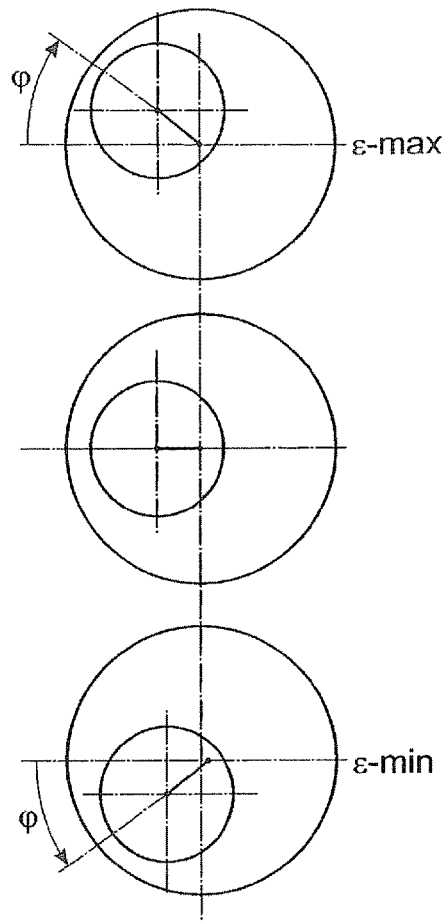
FIG. 16 illustrates an adjustment of a connecting rod.
Figure 17:
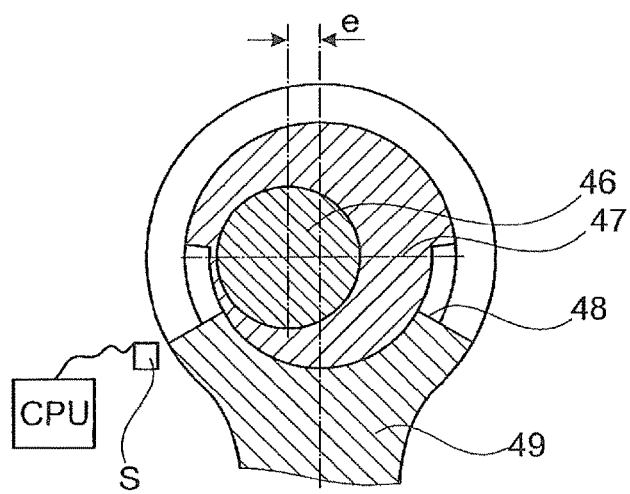
FIG. 17 illustrates an adjustment of a connecting rod.

FIGS. 15 to 17 show the adjustment of the effective connecting rod length $l_{eff}$, which results from the geometry of the length l and the eccentricity e, and the change of the compression ratio which results from $l_0$ and $l_{eff}$, as well as an exemplary embodiment of an eccentricity e. As indicated schematically, a position $\phi$ of the eccentric may be monitored by a sensor S, for example. Thus, it is possible to determine the present compression. Further, the end stop, $\epsilon$-max or $\epsilon$-min, can be used to detect the position of the adjustment device. The signals thus picked up may then be supplied from the sensor S to a motor control CPU, which is shown only schematically. Further, these FIGS. 15 to 17 show, in an exemplary manner, how the connecting rod 49 interacts with the piston pin 46 in the eccentric 47, which are arranged in the connecting rod eyelet, wherein an end stop 48 limits the eccentric adjustment.

Figure 18:
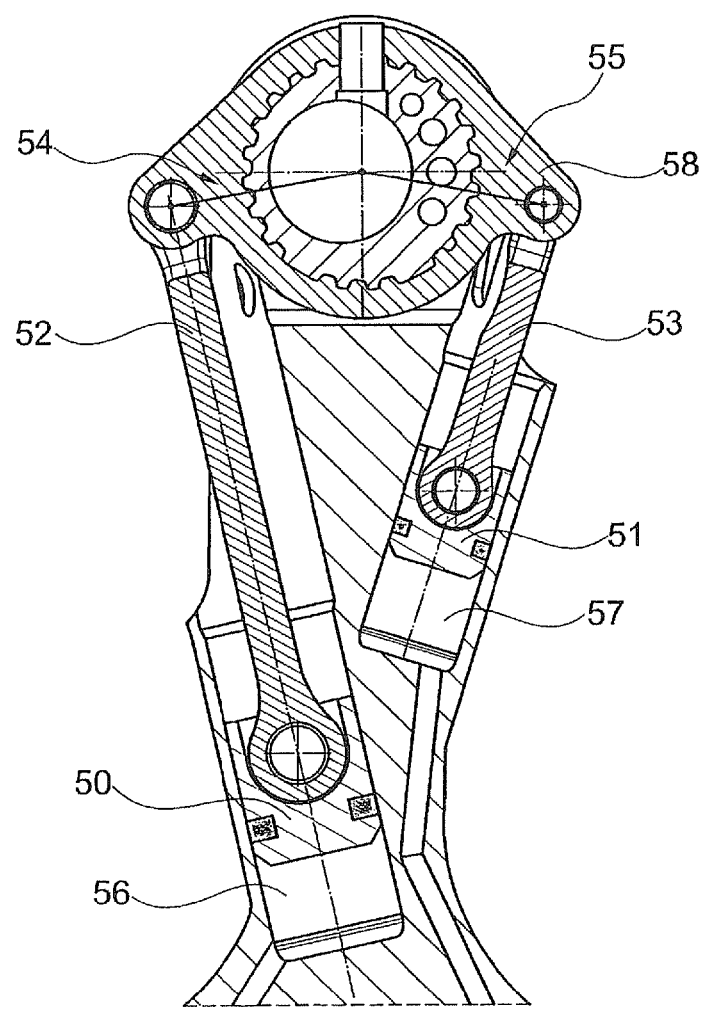
FIG. 18 shows an embodiment with different dimensions of the supporting piston and/or the support rod.

FIG. 18 shows an embodiment, from which also the different dimensions of the support pistons 50, 51 and/or the support rods 52, 53 are evident, as well as the support cylinders 56, 57 having different sized surface areas. Further, a different length of lever arm 54, 55 at the support lever 58 is possible. Thereby, the system can be adapted to the main direction of rotation of the engine, for example, by allowing different quantities of oil to be displaced and/or different adjustment rates. This diversity is intended, as will be explained hereunder with reference to FIG. 31.

Figure 19:
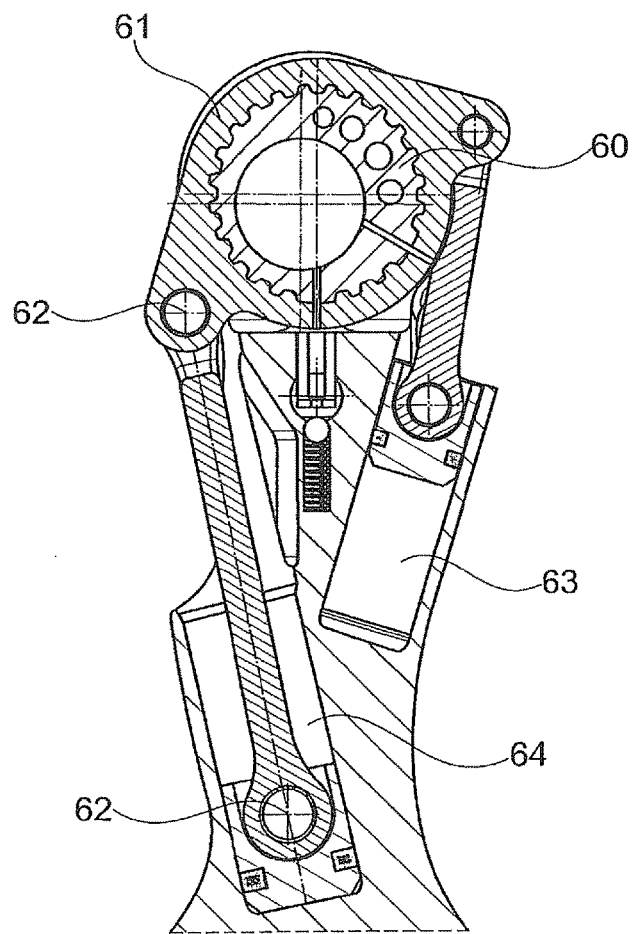
FIG. 19 illustrates further details of an adaptation to a specific sense of rotation, as well as to the structure of an eccentric.
Figure 20:
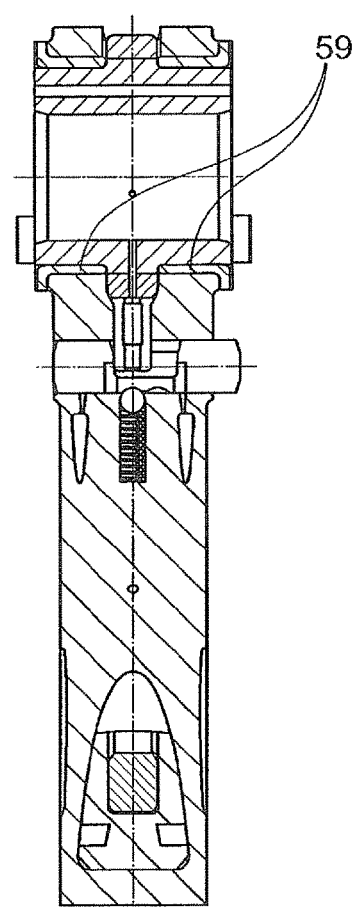
FIG. 20 illustrates further details of an adaptation to a specific sense of rotation, as well as to the structure of an eccentric.
Figure 21:
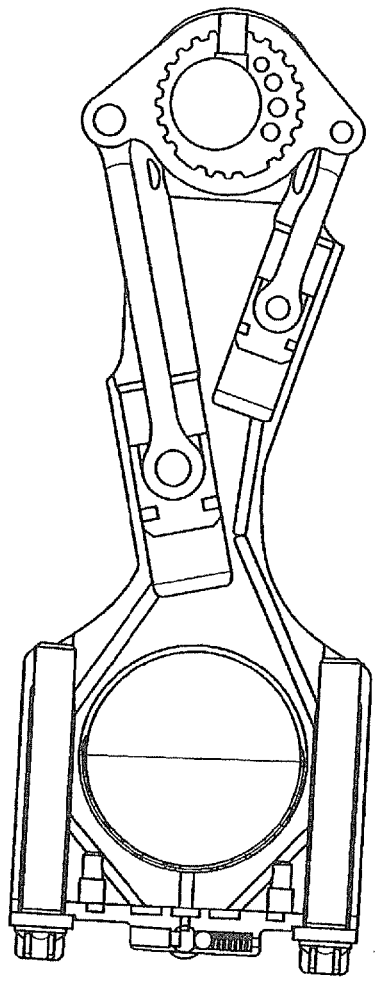
FIG. 21 shows an exemplary structure of a connecting rod with different components.
Figure 22:
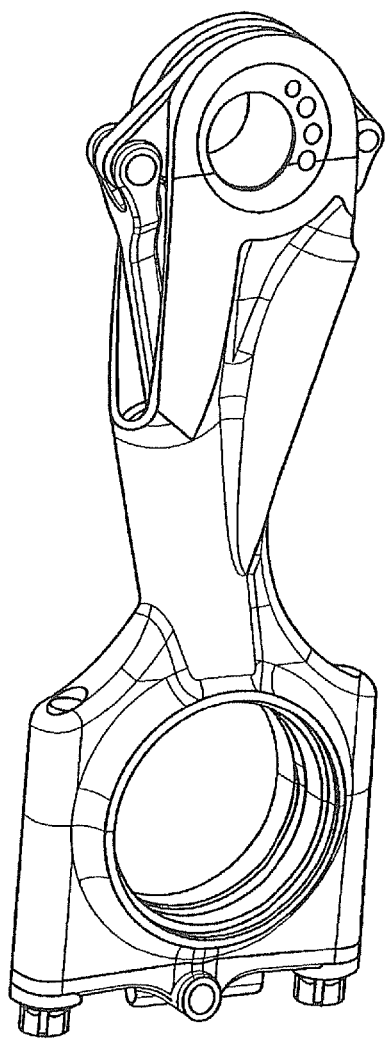
FIG. 22 shows an exemplary structure of a connecting rod with different components.
Figure 23:
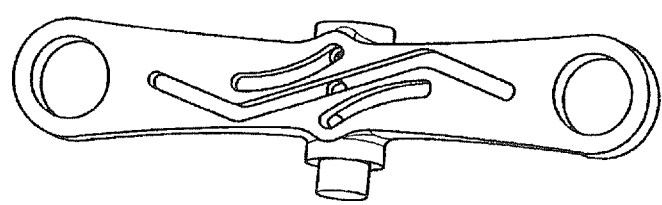
FIG. 23 shows an exemplary structure of a connecting rod with different components.
Figure 25:
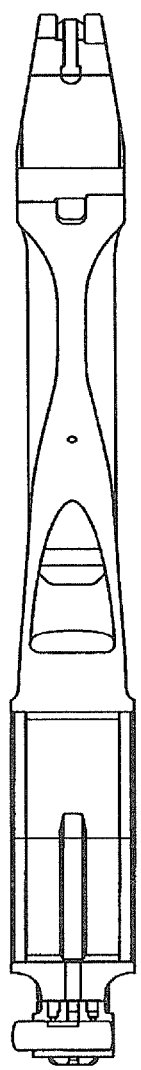
FIG. 25 shows an exemplary structure of a connecting rod with different components.
Figure 24:
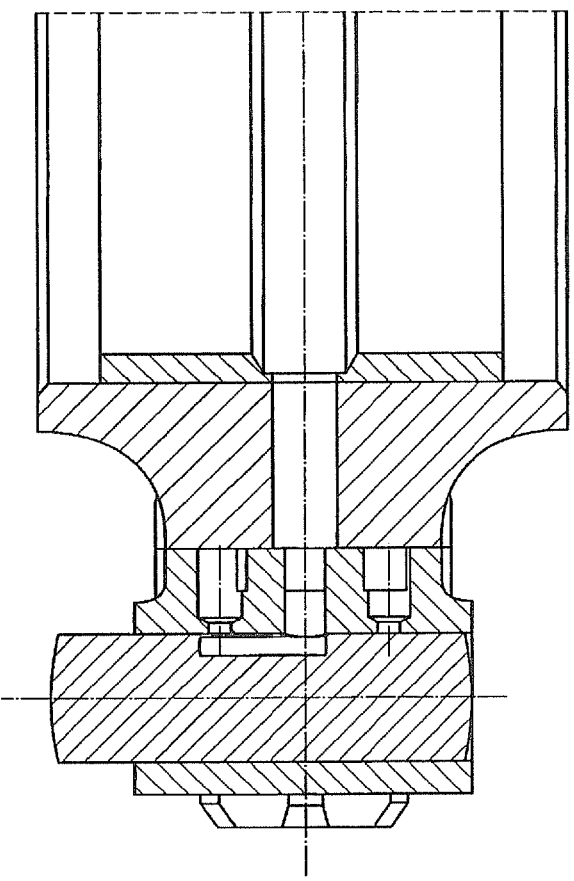
FIG. 24 shows an exemplary structure of a connecting rod with different components.
Figure 26:
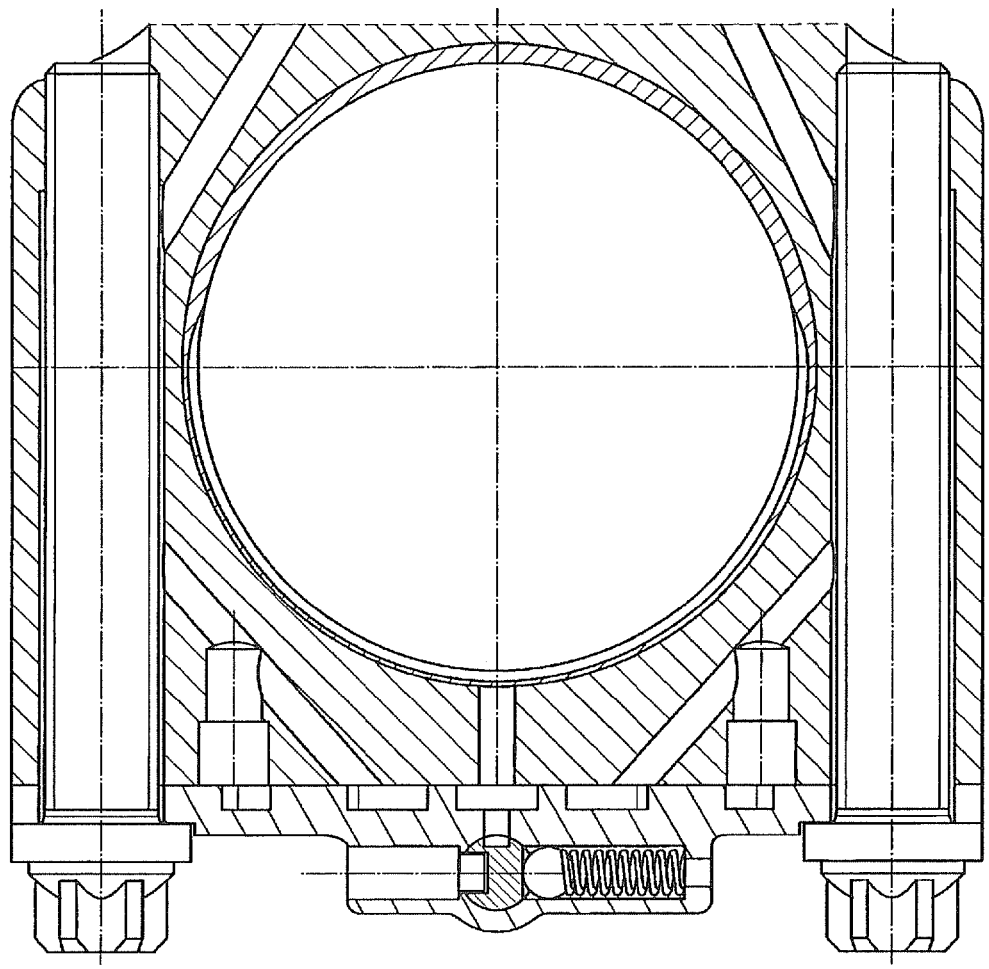
FIG. 26 shows an exemplary structure of a connecting rod with different components.
Figure 27:
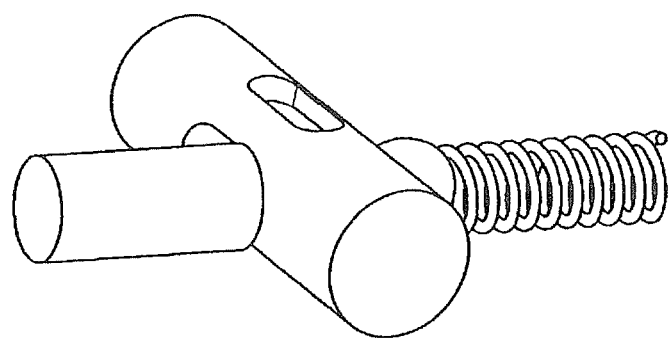
FIG. 27 shows an exemplary structure of a connecting rod with different components.
Figure 28:
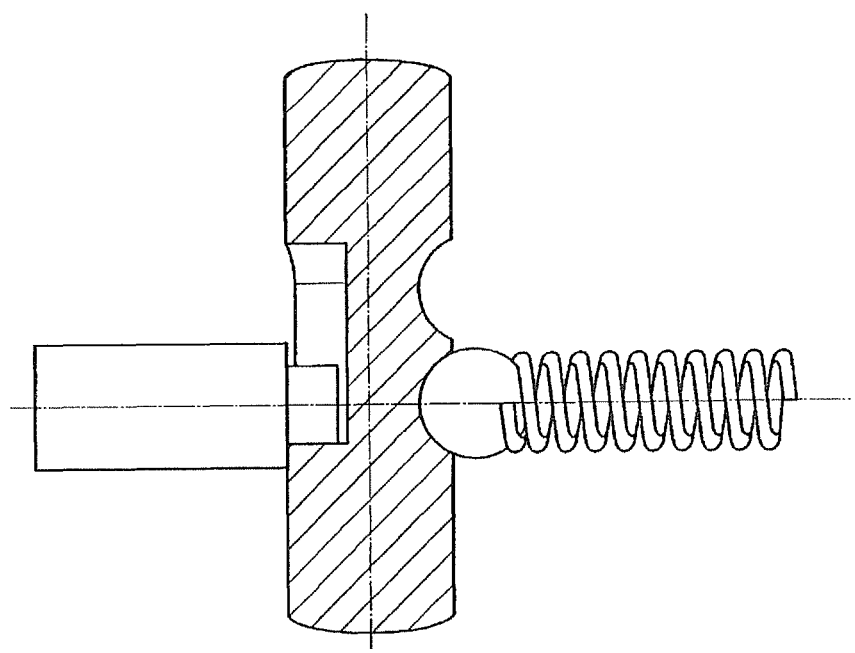
FIG. 28 shows an exemplary structure of a connecting rod with different components.

FIGS. 19 and 20 show further details of the adaptation to a specific direction of rotation, as well as to the structure of the eccentric or of the oil supply via the bearing rings 59 which may for example be provided in a split manner for the eccentric. The oil supply can, for example, be located in a central region, while, only in an outer region, the bearing rings 59 are respectively disposed laterally of the eccentric 60. Here, the eccentric is integrated in a lever 61 which is moved via hinges 62 and via the inertial mass force-side support cylinder 63 and the gas force-side support cylinder 64.

FIGS. 21 to 28 show exemplary illustrations of the structure of a connecting rod with various components, which allow a switching of the hydraulic adjustment mechanism from the outside by means of a switching system at an outer edge region of the connecting rod.

FIGS. 29 and 30 illustrate another arrangement, wherein an internal oil transfer occurs only in a switching direction. Preferably, when switching to a low compression, as shown in FIG. 29, the oil is recirculated to the supply system. Switching in this direction must be very fast to avoid knocking. During adjustment towards a low compression, see FIG. 29, it is particularly advantageous to strongly throttle the oil flow by means of a resistance, since a strong force acts. Upon adjustment in the other direction, i.e. toward a high compression, see FIG. 30, the displaced oil can flow out via an opening, for example, into the crankcase 65 or into a collecting line. The adjustment towards a high compression can be designed to be slower, since the risk of knocking can be ignored. Further, a weaker force acts. During the adjustment towards a high compression, a regeneration of oil may be provided. The displaced quantity of oil, which for example flows into the crankcase or a collecting line, is replaced with a different quantity of oil. An oil exchange is particularly advantageous, for example, in the event of a formation of bubbles. In this event, foamy oil is replaced with fresh oil. Further, there is the advantage that the pressure in the support chamber of the right support cylinder in FIG. 30 is smaller than in an arrangement with a complete internal oil transfer, see the support cylinder 11 in FIG. 2. An adjustment towards a high compression is can be made faster with the arrangement of FIG. 30 than with the arrangement of FIG. 2. At low rotational speeds and when only small inertial forces are effective on the piston at the top dead center during the charge cycle, this has particularly advantageous effects.

Figure 31:
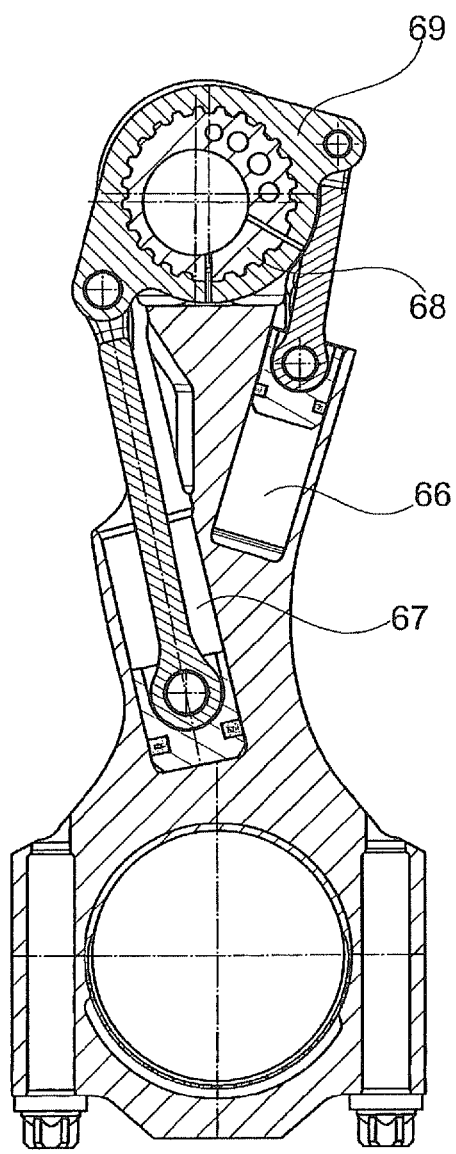
FIG. 31 illustrates an embodiment of a system with a 3/2-way valve without internal oil transfer.

In FIG. 31, a possible embodiment of a system with a 3/2-way valve is shown without internal oil transfer. This illustrative example serves to show, how a system without internal oil transfer operates. The inertial mass force-side support cylinder 66 and the gas force-side support cylinder 67 are intentionally provided with different diameters. The left cylinder supports the eccentric moment caused by the gas force. It is referred to as the gas force-side support cylinder 67. The right cylinder supports the eccentric moment. The same is a result of inertial mass force acting during the gas exchange phase. Therefore, the right cylinder 66 is referred to as the inertial mass force-side support cylinder. The maximum gas force is usually greater than the maximum inertial mass force. By these differences in diameter, it is achieved that the resulting maximum pressures in the supporting cylinders are as equal as possible. The eccentric 68 is adjusted by the lever 69 which is moved by means of the supporting cylinders.

Figure 32:
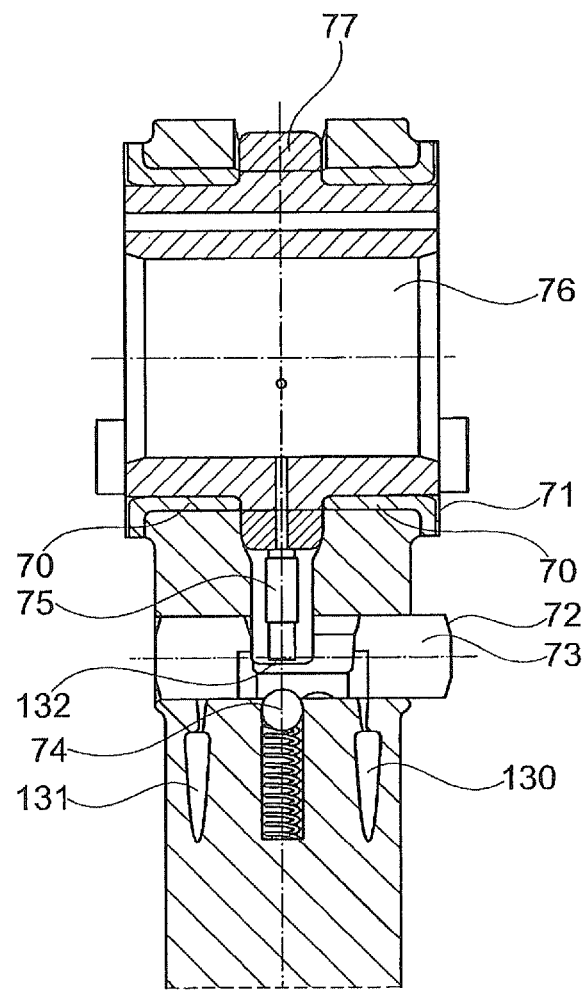
FIG. 32 is a sectional view of the system shown in FIG. 31.

FIG. 32 is a sectional view of the same embodiment as shown in FIG. 31. The eccentric 76 is supported in bearing rings 70, preferably of a bronze material, in the connecting rod together with the lever 77. The bearing rings 70 are, for example, provided with a wear-resistant thrust washer 71 at the end faces, since, in this case, a piston-end guiding is provided in the piston. It is an advantage of the piston-end guiding that the follower surface 72 is aligned as exactly as possible with the crankcase and thus with the mechanical actuation. The valve body 73 is parallel to the pins and is situated below the small connecting rod eyelet. At the end faces, the valve body is provided, for example, with dome-like follower surfaces 72. To switch the valve, these domes are brought into operative connection with a cam disc. The valve body can take two defined positions. A traveling path of, in this case, about 4 mm exists between these positions. The valve body 73 is urged by a detent 74 which comprises a ball, a spring and a corresponding contour of the valve body, into its end position. The traveling path of the valve body 73 is limited by a limiter 75. Presently, the valve is designed as a slide valve. The valve body has control edges, which respectively open or close one of the two inflow bores, and thus allow for an oil flow through the supply line from the inertial mass force cylinder 130 or the supply line from the gas force cylinder 131, wherein an orifice 132 is provided behind the valve. The eccentric 76 is adjusted by means of the lever 77.

Figure 33:
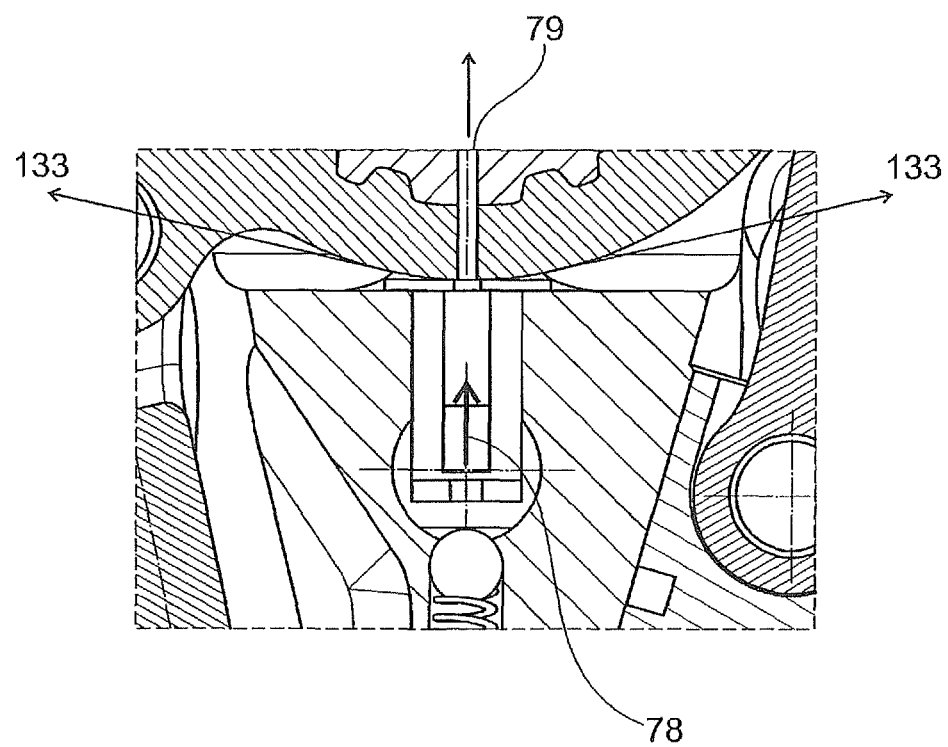
FIG. 33 shows details of the orifice shown in FIG. 31 and FIG. 32.

FIG. 33 shows a detail of FIG. 32. From the respective open supply bore oil 133 flows. This occurs during the adjustment by an orifice integrated in the limiter. The oil 78 flowing through the orifice as well as the lubricating oil bore to the piston pin bearing 79 are illustrated. A gap is formed between an upper end face of the limiter and the lever, through which the oil can eventually flow into the crankcase, for example. However, some of the oil flows through a lubricating oil bore to the piston pin bearing 79.

Figure 34:
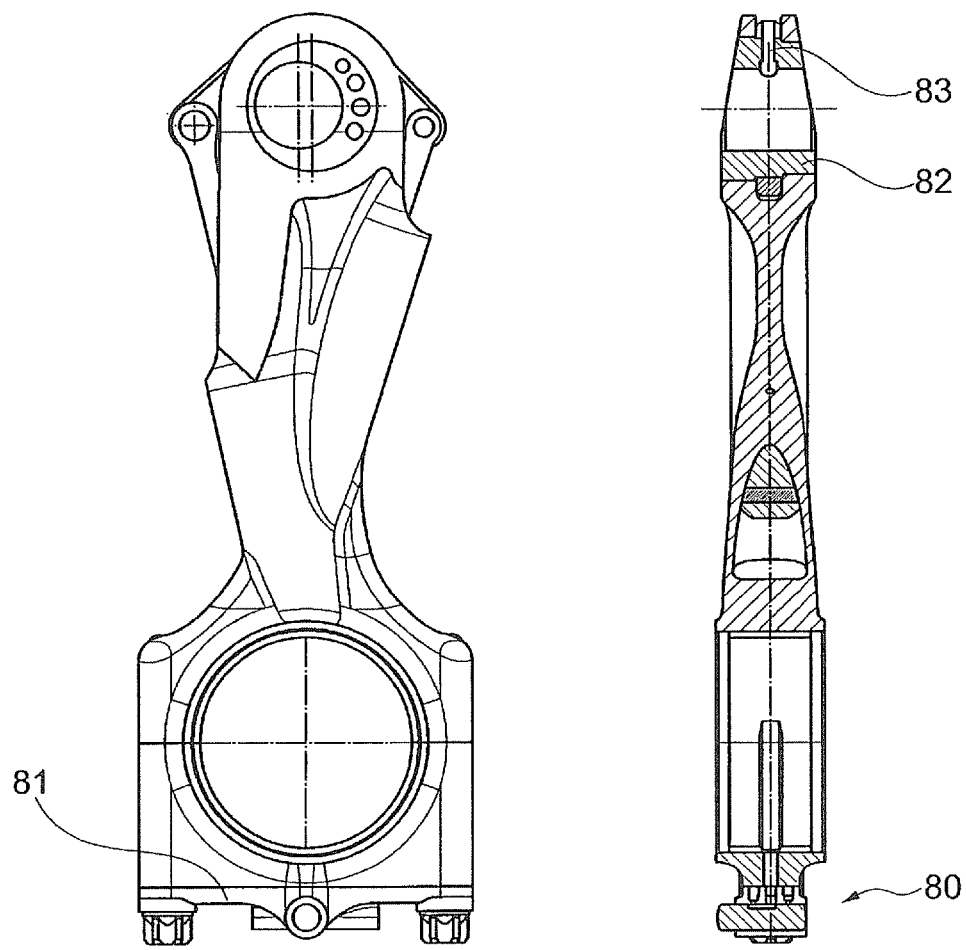
FIG. 34 shows an embodiment with a 3/2-way valve and internal oil transfer in a front and side elevational view.

FIG. 34 illustrates an embodiment with a 3/2-way valve and an internal oil transfer. In this embodiment, simplified with respect to manufacturing technology, the valve 80 is situated in a separate hydraulic module 81, which is connected with the connecting rod caps via the connecting rod screw joint. Owing to this structure, the bore system in the connecting rod can be significantly simplified. Another exemplary feature of the embodiment illustrated is the direct bearing of the eccentric 82 in the small connecting rod eyelet, without bearing rings. During assembly, the eccentric 82 is inserted axially from one side. For this purpose, the two eccentric bearings are provided with different diameters. For securing the eccentric in the axial direction, a retaining piece 83 is used, which is disposed radially in the eccentric 82 and is inserted from the inner side and secures the eccentric. The connecting rod is crank-end guided at the crankpin to achieve the most exact alignment for the actuation. The eccentric 82 is preferably provided with a "diamond-like carbon" coating. For a reduction of weight, bores are formed axially in the eccentric. In addition, the area around the small connection rod eyelet is given a trapezoidal shape, as an example.

Figure 35:
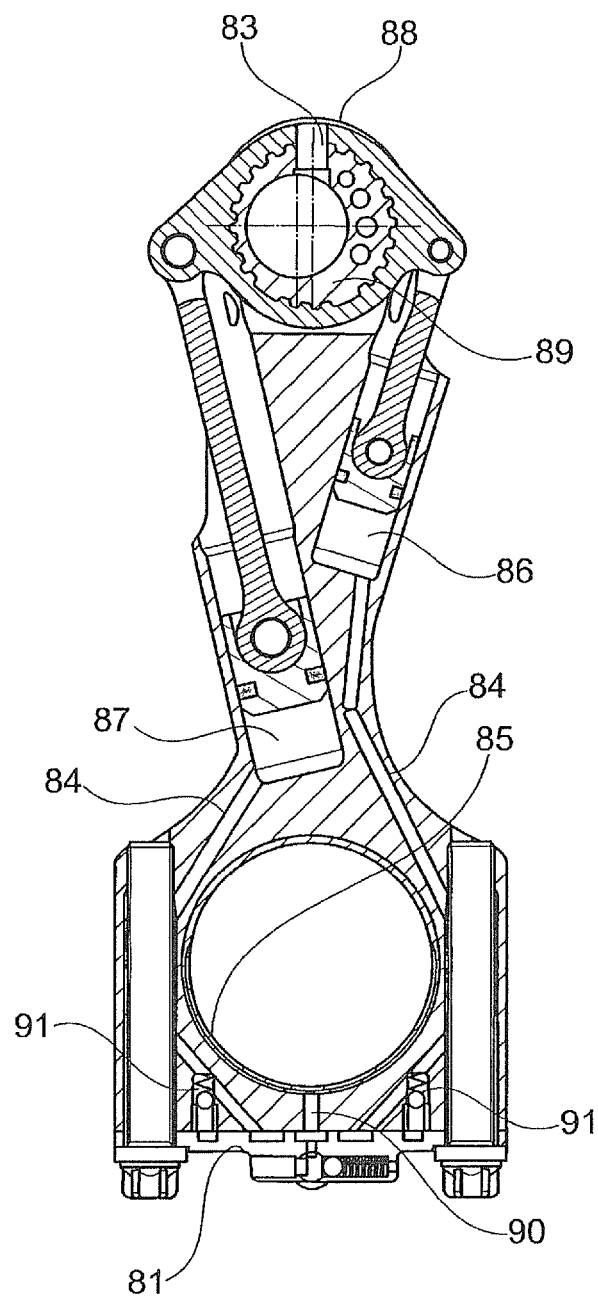
FIG. 35 is a sectional view of the embodiment shown in FIG. 34.
Figure 36:
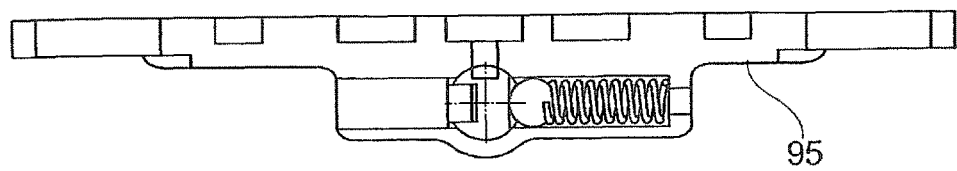
FIG. 36 shows a hydraulic circuitry in a hydraulic module with various details.
Figure 37:
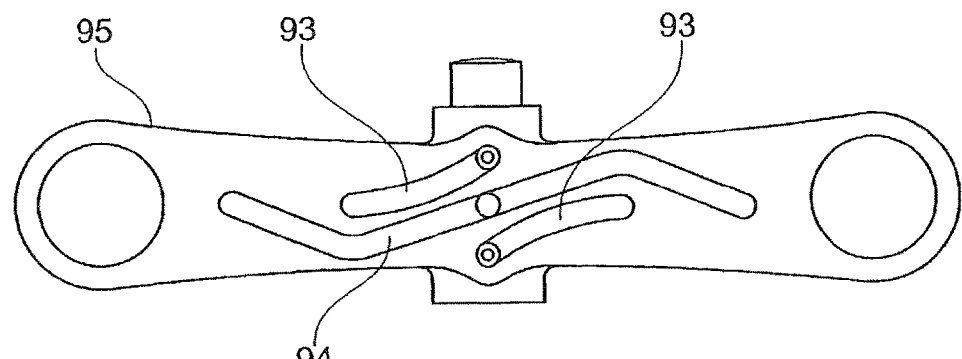
FIG. 37 shows a hydraulic circuitry in a hydraulic module with various details.

FIG. 35 shows the embodiment illustrated in FIG. 34 in section. The connecting lines 84 between the inertial mass force-side supporting cylinder 86, the gas force-side support cylinder 87 and the separate hydraulic module 81 use the annular gap around the connecting rod screws for oil transfer via the separation surface between the upper and lower parts of the connecting rod. A particularly preferred variant is provided with blind bores for the connecting rod screws. The compensation line 90 connects the oil supply groove 85 in the connecting rod bearing with the hydraulic module. Upon an adjustment towards a low compression, excess oil flows into the oil supply groove in the connecting rod bearing. In the other adjustment direction, additionally needed oil is drawn. The non-return valves 91 are situated in the upper part of the connecting rod and can be secured axially by the hydraulic module. In order to secure the eccentric axially, a retaining piece 83 is provided which is arranged radially in the eccentric 89 and is inserted from the inner side, while, on the outside, it is prevented from slipping out by a collar 88.

Figure 38:
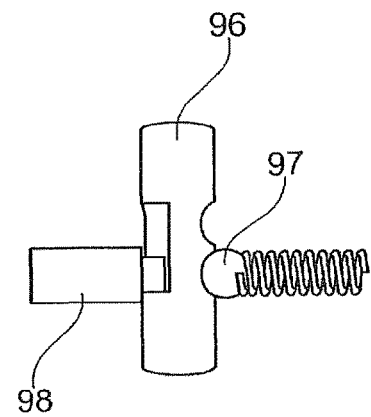
FIG. 38 shows a hydraulic circuitry in a hydraulic module with various details.
Figure 39:
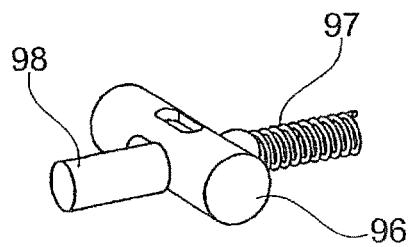
FIG. 39 shows a hydraulic circuitry in a hydraulic module with various details.
Figure 40:
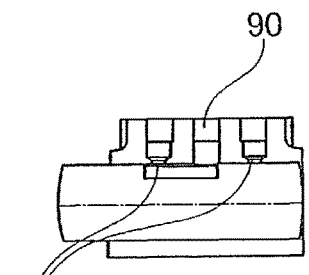
FIG. 40 shows a hydraulic circuitry in a hydraulic module with various details.

FIG. 36 to FIG. 40 show the hydraulic circuitry in the hydraulic module. The connecting lines 93 and the compensation line 94 are shown as grooves in the hydraulic module 95. The orifices 92 are illustrated as offset bores. FIGS. 38 and 39, in particular, show the detent 97 mounted on the valve body 96 and the limiter 98.

Figures 41, 42, 43, 44, 45:
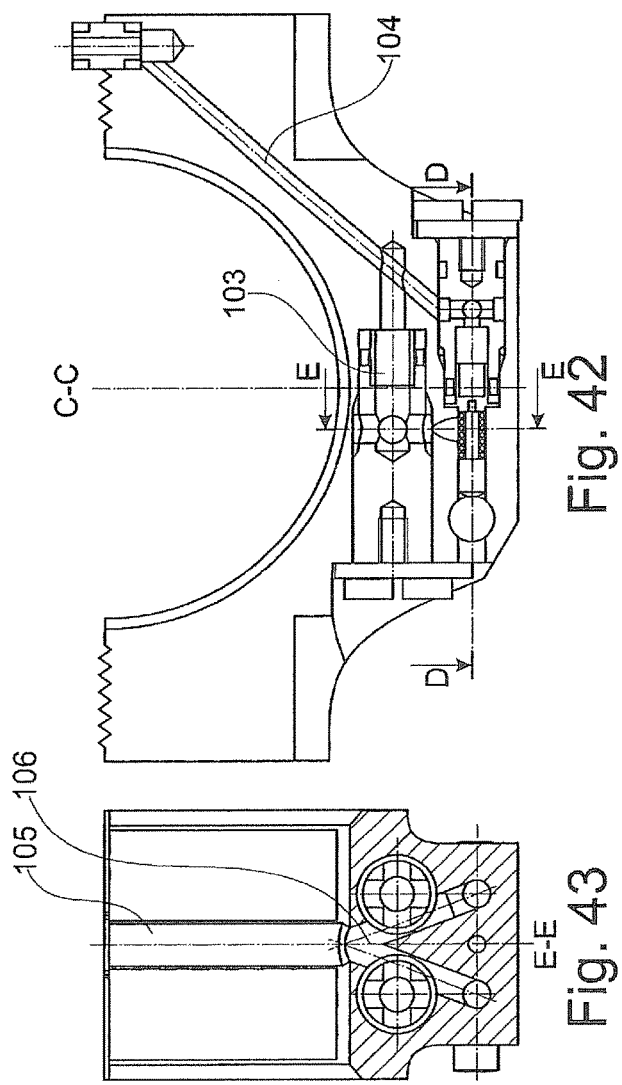
FIG. 41 shows an embodiment of a connecting rod eyelet in different views.
FIG. 42 shows an embodiment of a connecting rod eyelet in different views.
FIG. 43 shows an embodiment of a connecting rod eyelet in different views.
FIG. 44 shows an embodiment of a connecting rod eyelet in different views.
FIG. 45 shows an embodiment of a connecting rod eyelet in different views.

FIG. 41 to FIG. 45 illustrate an embodiment of a connecting rod eyelet which is used in utility vehicles, for example. The embodiment has a 3/2-way valve and an internal oil transfer. According to this embodiment, the 3/2-way valve function is realized by two 2/2-way valves 99, which are designed as seat valves. These are opened and closed alternately by means of a plunger 100. This is shown in section in FIG. 42, in FIG. 43 and in FIG. 44. A non-return valve adjoins the 2/2-way valves. FIG. 42 shows the connecting line 104 to the support cylinders. The same leads via the connecting rod screw joint having a sleeve which is sealed by means of O-rings. FIG. 43 shows the supply groove 105 and the compensating line 106. The 2/2-way valves 99 have a ball valve that is pushed open by a plunger 100 to realize the "open position". The 2/2-way valve 99 is adjoined by an orifice 107. The limiter 108 and the detent 109 secure the position of the follower element 101. A spring presses the plunger 100 radially against an opening ramp 102 formed on the follower element 101. The spring should be dimensioned such that an opening due to centrifugal force is prevented. In each outflow line, a separate resistance is provided, whereby, for example, the oil flow can be throttled differently. FIG. 45 is a side elevational view of the embodiment illustrated.

FIGS. 46 to 50 illustrate different possibilities to convey oil from the crankshaft into the connecting rod, including an oil supply groove and a fluid supply system. Here, the fluid supply system may be an accumulator and may further comprise a fluid reservoir. FIGS. 46 to 50 respectively illustrate an upper bearing shell 122 and a lower bearing shell 123 with various embodiments of a supply groove 110, a supply bore 111, and a transfer window 112 for the oil flow. In FIGS. 46 to 50, the oil flow is respectively indicated by arrows.

The turning of the eccentric results from the moment generated at the eccentric. This moment is, in turn, the result of a superposition of the gas force and the inertial mass force at the piston pin. The moment is not constant over time, but follows a specific time course or a course as a function of the crank angle. The course is periodic and repeats itself every two engine revolutions. Given a corresponding asymmetrical design of the supporting cylinder diameter, oil is needed upon an adjustment towards a high compression, i.e. when the gas force-side support piston emerges. During this phase, it must be ensured that oil flows from the connecting rod bearing into the connecting rod, yet without inadvertently drawing air through the bearing gap.

Figure 46:
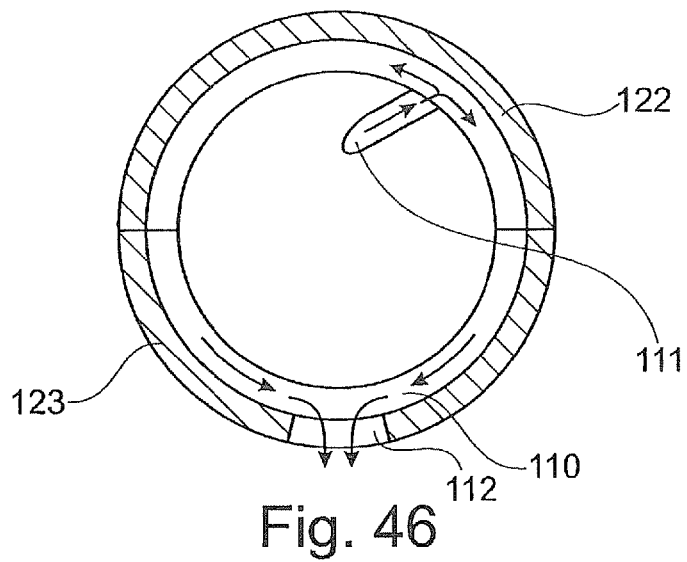
FIG. 46 illustrates different ways to convey oil from a crank shaft to a connecting rod.

FIG. 46 illustrates a circumferentially extending 360° supply groove 110 in the connecting rod bearing and only one outflow point of a supply bore 111 on the crankpin surface. Here, the supply groove 110 is supplied at all times with fresh oil and a constant flow of oil can be ensured by the transfer window 112. At any given time, a demand for oil in the connecting rod can be met.

Figure 47:
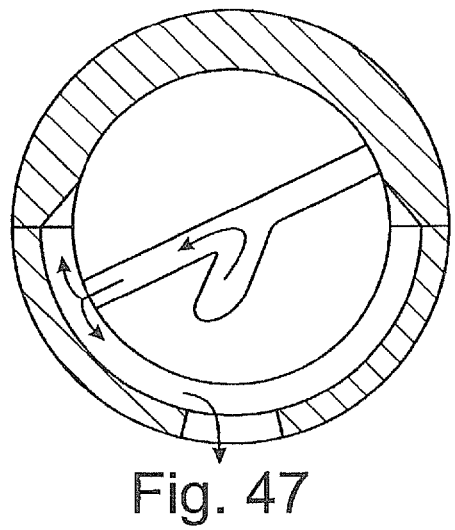
FIG. 47 illustrates different ways to convey oil from a crank shaft to a connecting rod.

FIG. 47 shows a 180° supply groove, preferably made in the lower bearing shell, as well as bore passing through the crankpin centre. In this case, an oil demand in the connecting rod can also be met at any time. The 180° supply groove can be rotated as desired on the circumference. Preferably, an angular orientation is selected such that the groove is situated in a region that is loaded as little as possible.

Figure 49:
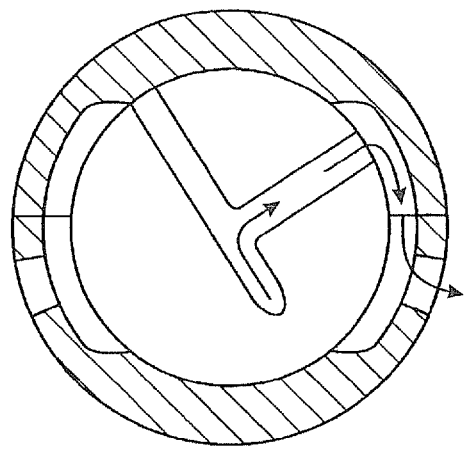
FIG. 49 shows different oil supply systems from crankpin to connecting rod.

FIG. 49 shows two 90° grooves which are preferably oriented symmetrically with respect to the separating surface, as well as two supply bores, wherein one of the bores precedes the other by 90°. Again, a demand for oil in the connecting rod can be met at any time. The two grooves can be rotated as desired on the circumference, as long as the distance between the grooves is equal to the length of an individual groove. Preferably, an angular orientation is selected that also is in a region that is loaded as little as possible.

In the variants illustrated in FIGS. 46, 47 and 49, a connection between the supply bore in the crankpin and the transfer window in the connecting rod bearing shell is provided for any given crank angle. This causes additional manufacturing effort, because the connecting rod bearings have to be provided with grooves instead of only one bore. As a result of these measures, load bearing capacity problems may arise in the connecting rod bearing.

Figure 48:
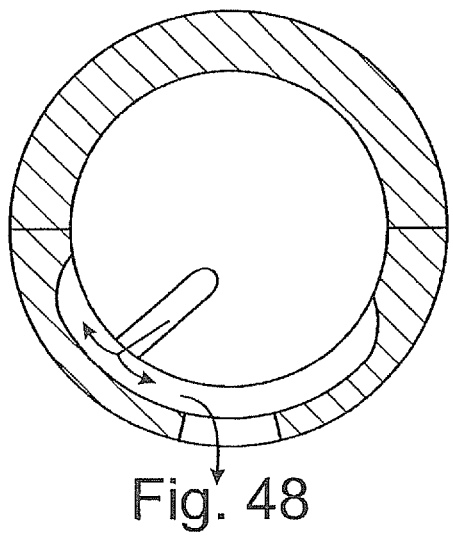
FIG. 48 shows different oil supply systems from crankpin to connecting rod.

The variant in FIG. 48 comprises only one groove and a supply bore. In this case, an oil demand in the connecting rod can be met only over a certain crank angle range. For a given position of the outlet of the supply bore on the crankpin surface and for a known crank angle range, in which a demand for oil exists, a it is possible to design a minimum required angular extent of the groove in the connecting rod bearing. However, the problem is that the phase during which an oil demand exists, changes with the operating point of the engine, i.e. it is not constant.

Figure 50:
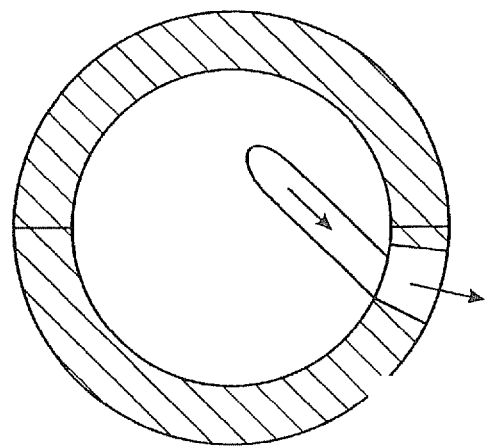
FIG. 50 shows different oil supply systems from crankpin to connecting rod.

In the variant illustrated in FIG. 50, only one transfer window or a very short groove is provided in the vicinity of this window. As a consequence, only a very slight weakening of the connecting rod bearing is caused, especially when the transfer window is positioned in the least loaded region. A connection with the connecting rod is made over only a relatively small crank angle range. This crank angle range is normally smaller than the crank angle range over which a demand for oil exists in the connecting rod.

Accordingly, in the variants of FIG. 48 and FIG. 50, an intermittent supply of the connecting rod is given.

Figure 51:
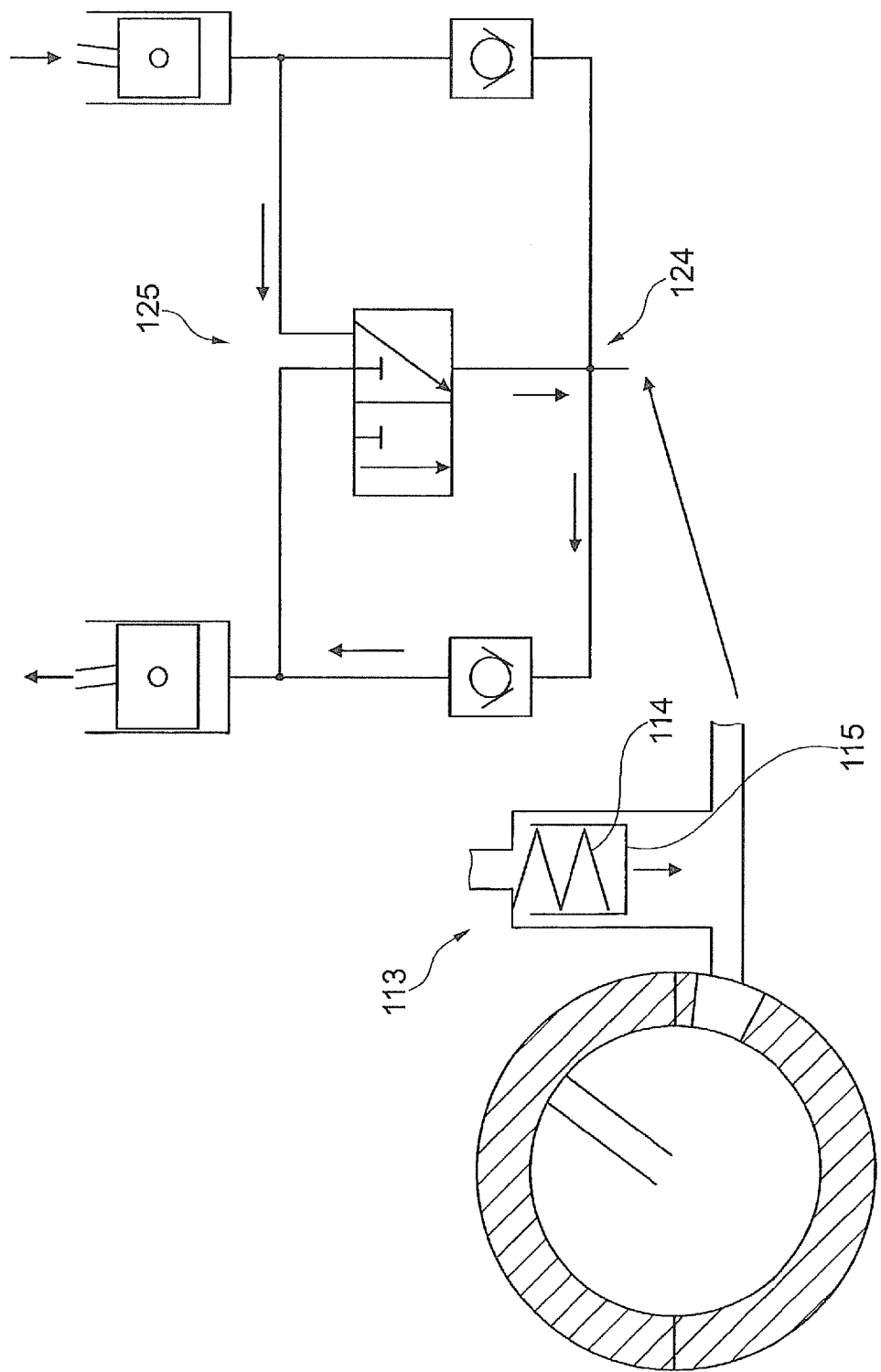
FIG. 51 shows the arrangement of an accumulator.

FIG. 51 illustrates a hydraulic diagram 125, which is complemented by a fluid supply system 124. In this example, the fluid supply system 124 includes a fluid reservoir 113, which is realized as an accumulator, for example. By this arrangement of the fluid reservoir 113, a continuous supply of oil to the hydraulic system is ensured. The fluid reservoir 113 is located between the transfer window in the connecting rod bearing and the hydraulic system. The accumulator, illustrated herein as an example, is preferably arranged parallel to the crankshaft axis because of the moments of inertia. In the case shown in FIG. 51, the gas force-side support cylinder emerges, so that a demand for oil exists. At this moment, the outlet of the supply bore in the crankpin is not yet positioned over the transfer window. The oil demand is met by the accumulator such that the spring 114 of the accumulator shifts a piston 115 that correspondingly displaces a volume of oil. When the supply bore is positioned over the transfer window, the accumulator is refilled. Preferably, the axis of the accumulator piston is in parallel to the crankshaft axis, so that the inertial forces acting on the accumulator piston are directed perpendicular to the piston axis, and thus do not affect the spring force. The oil pressure prevailing at the connecting rod eyelet is preferably between 3 and 8 bar. The accumulator has the effect that no pressure drop occurs, since otherwise oil will leak from the lubricating gap and lead to damage to components, or even to a drawing of air.

Figure 52:
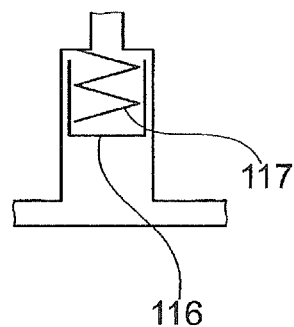
FIG. 52 shows different accumulator variants.
Figure 53:
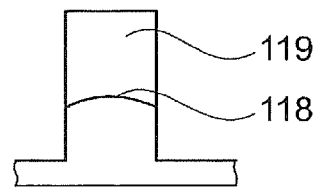
FIG. 53 shows different accumulator variants.
Figure 54:
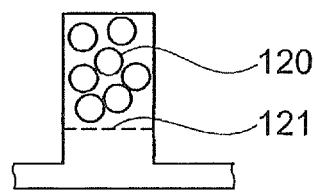
FIG. 54 shows different accumulator variants.

The accumulator may be realized, for example, as shown in FIG. 52, as a spring accumulator with spring 116 and piston 117, and/or, as illustrated in FIG. 53, as a bubble accumulator 119, i.e. with a diaphragm 118 and a gas filling 119. Another approach according to FIG. 54 provides for gas-filled spheres 120, which are separated from the oil chamber by means of an oil-permeable screen 121.

Figure 55:
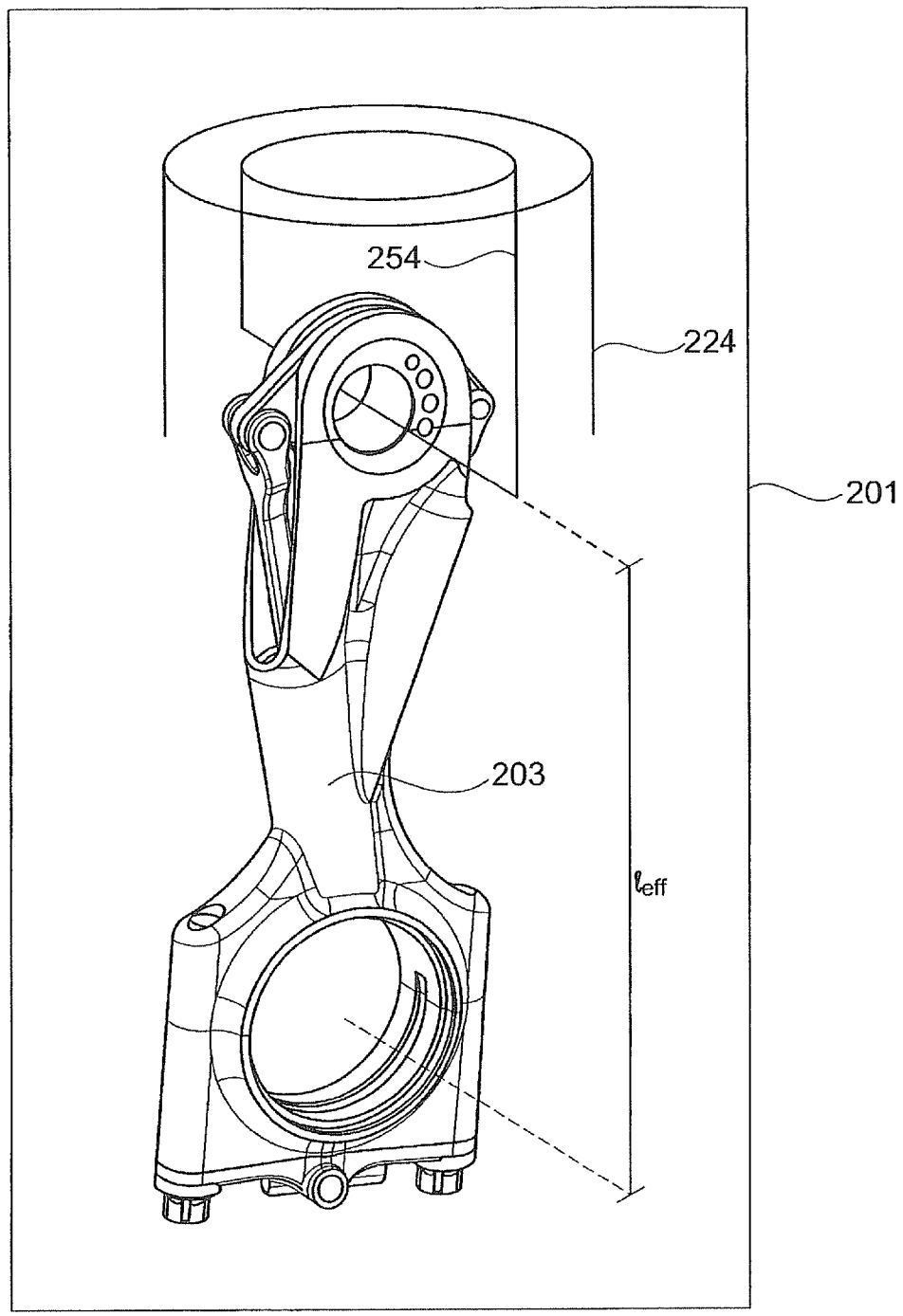
FIG. 55 shows a connecting rod in a reciprocating-piston internal combustion engine.

FIG. 55 illustrates an example of a connecting rod 203, which is arranged in a reciprocating-piston internal combustion engine 201 with a cylinder 224 and a piston 254. The reciprocating-piston internal combustion engine 201, the piston 254 and the cylinder 224 are illustrated only schematically. The effective length of the connecting rod $l_{eff}$ is changed by actuation of the adjustment mechanism 202. This change in the effective length $l_{eff}$ of the connecting rod causes a change in the stroke of the piston 254, and thus a change in the compression ratio.

Figure 56:
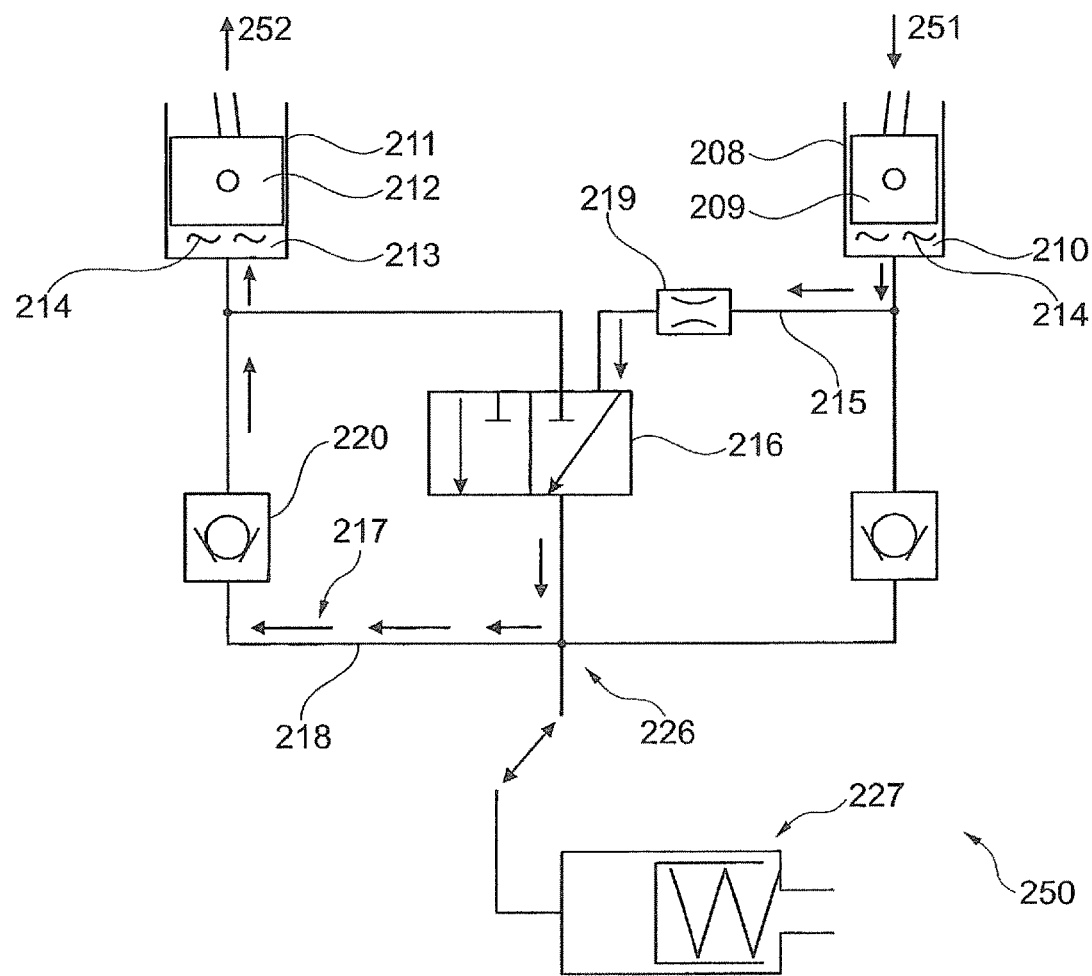
FIG. 56 shows a hydraulic diagram of an adjustment mechanism.

FIG. 56 shows a hydraulic diagram 250 having a first hydraulic cylinder 208 having a first piston 209 and a first fluid chamber 210. The first fluid chamber 210 is filled with a fluid 21. When the first hydraulic cylinder becomes smaller in the direction of movement 251 and displaces fluid 214, a fluid flow 217 flows through the first fluid line 215 into a second fluid chamber 213 of a second hydraulic cylinder 211 with a second piston 212. Thereby, the second hydraulic cylinder 211 becomes larger in the direction of movement 252. The first fluid line 215 can be interrupted by means of a valve system 216. In the present case, the valve system has the function of a 3/2-way valve, for example. Further, a non-return valve 220 limits the direction of fluid flow 217 in the first fluid line 215 to one direction and a first resistance 219 which is arranged, for example, in the first fluid line 215, limits the rate at which the first hydraulic cylinder 208 becomes smaller. The hydraulic diagram 250 further comprises a fluid supply system 226 with a fluid reservoir 227. Excess fluid may be collected and stored, for example, in the fluid reservoir 227, and can be recirculated from the fluid reservoir 227 to the fluid flow 217. Here, the fluid supply system 226 may be, for example, connected directly to the first fluid line 215, or the fluid supply system 226 may, for example, be connected to the first fluid line 215 via a second fluid line 218. It is also possible, for example, that the second fluid line 218 uses the first fluid line 215. With this hydraulic diagram 250, a fluid 214 can either flow directly into a second hydraulic cylinder 211 from a first hydraulic cylinder 208 and/or an excess or additionally needed fluid can be compensated by the fluid supply system 226.

Figure 57:
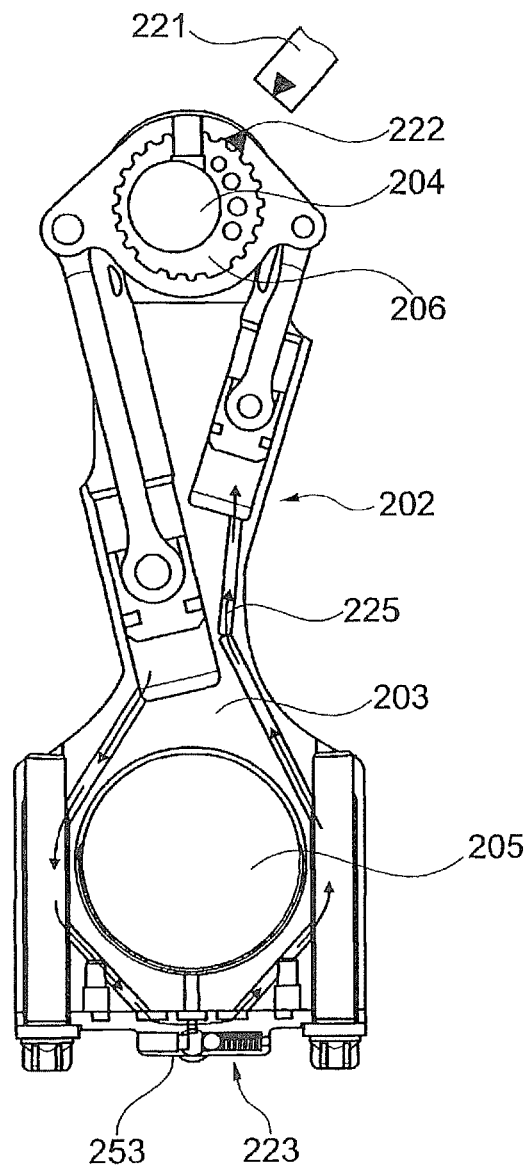
FIG. 57 shows a connecting rod with an adjustment mechanism.

FIG. 57 illustrates a sectional view of a connecting rod 203 with an adjustment mechanism 202, wherein the adjustment mechanism 202 may include, for example, a hydraulic circuit of the hydraulic diagram 250 of FIG. 56. The connecting rod has a connecting rod bearing eyelet 204 with an eccentric 206. Furthermore, at the connecting rod bearing eyelet, an example of a possible system for a defined position detection 221 is shown, by means of which, for example, a defined position 222 of the adjustment mechanism can be approached and/or detected. In this example, the fluid line 225 extends within the connecting rod 203. In the present example, the fluid line uses the connecting rod screws and connects the hydraulic cylinder of the adjustment mechanism. By way of example, a possible fluid flow is shown by arrows. It can be interrupted by means of a valve system 253. In the present example, a valve system 253 is arranged on the outer side 223 of the connecting rod in the region of the crank bearing 205.

According to a development that can be pursued as an independent idea, the features proposed and the method proposed can be useful in other applications, e.g. a piston or a crankshaft.

The invention claimed is:

1. A reciprocating-piston internal combustion engine having a hydraulic adjustment mechanism integrally provided within a connecting rod and comprising: at least one eccentric supported in a connecting rod bearing eyelet or in a piston pin bearing eyelet of the connecting rod that adjusts at least one variable compression ratio in at least one cylinder of the reciprocating-piston internal combustion engine by changing an effective length of the connecting rod with the hydraulic adjustment mechanism, wherein the hydraulic adjustment mechanism includes a first hydraulic cylinder having a first piston in a first fluid chamber and a second hydraulic cylinder with a second piston in a second fluid chamber, the hydraulic cylinders are operated with a fluid, and a setting of at least the one variable compression ratio is effected with a movement of at least the first piston in the first hydraulic cylinder, wherein the first and the second fluid chambers are connected via a first fluid line for a back-and-forth flow of the fluid between the first and the second fluid chambers during movement of the first piston in the first hydraulic cylinder, and the first fluid line is arranged in the connecting rod.

2. The reciprocating-piston internal combustion engine according to claim 1, wherein a valve system is arranged in the first fluid line, a fluid flow in the first fluid line being interrupted by the system.

3. The reciprocating-piston internal combustion engine according to claim 1, further comprising:
   a fluid supply system is connected to the first fluid line, whereby upon movement of the first piston in said first hydraulic cylinder, an additionally required quantity of fluid flows into the first fluid chamber and an excess amount of fluid in the first fluid chamber in the first hydraulic cylinder flows into in the fluid supply system, and the fluid supply system includes a fluid reservoir in which the excess quantity of fluid is collected and from which the additionally required quantity of fluid is supplied,
   wherein the fluid supply system is connected directly with the first fluid line or, via a second fluid line, with the first fluid line which is a connection between the first fluid line and the fluid supply system.

4. The reciprocating-piston internal combustion engine according to claim 1, wherein the first piston and the second piston have differently sized piston surfaces, and the first hydraulic cylinder and the second hydraulic cylinder correspondingly have differently sized cross sections.

5. The reciprocating-piston internal combustion engine according to claim 1, wherein the first fluid line has a first resistance by which the back-and-forth flow of the fluid is throttled and a rate for adjusting at least one variable compression ratio is defined thereby.

6. The reciprocating-piston internal combustion engine according to claim 1, wherein a non-return valve is provided in the first fluid line to restrict the back-and-forth flow of the fluid to one direction at a location in the first fluid line at which the non-return valve is arranged.

7. The reciprocating-piston internal combustion engine according to claim 1, wherein the hydraulic adjustment mechanism includes a system for the detection of a defined position of the hydraulic adjustment mechanism.

8. The reciprocating-piston internal combustion engine according to claim 1, wherein the hydraulic adjustment mechanism has a defined position.

9. The reciprocating-piston internal combustion engine according to claim 1, wherein a valve system is arranged at each connecting rod, in which the valve system is in the region of piston pin bearing eyelet on an outer side of the connecting rod, so that the valve system can be actuated from outside the connecting rod.

10. A method for changing a variable compression ratio in a cylinder of a reciprocating-piston internal combustion engine comprising: actuating a hydraulic adjustment mechanism integrally provided within a connecting rod of a reciprocating-piston internal combustion engine, wherein the connecting rod comprises a piston pin bearing eyelet at one end and a connecting rod bearing eyelet at the other end, wherein an eccentric, supported in one of the eyelets, turns in the piston pin bearing eyelet or the connecting rod bearing eyelet, provided that a first piston moves in a first hydraulic cylinder and, in the opposite direction, a second piston moves in a second hydraulic cylinder, wherein an effective length of the connecting rod is changed, and in the connecting rod, the movement of the piston causing the adjustment of the eccentric is effected by means of a fluid transfer flow through a first fluid line from the first hydraulic cylinder directly into the second hydraulic cylinder.

11. The method according to claim 10, wherein an overflow of the fluid from the first hydraulic cylinder into the second hydraulic cylinder occurs via a fluid line, whereby this overflow is interrupted by means of a valve system.

12. The method according to claim 10, wherein excess fluid in the first fluid line flows into a fluid supply system, and an additional need for fluid in the first fluid line is fed from the fluid supply system.

13. The method according to claim 10, wherein the hydraulic adjustment mechanism is moved into a defined position.

* * * * *